United States Patent
Yu et al.

(10) Patent No.: US 11,082,884 B2
(45) Date of Patent: Aug. 3, 2021

(54) COMMUNICATION METHOD, TERMINAL DEVICE, AND ACCESS NETWORK DEVICE

(71) Applicant: Huawei Technologies Co., Ltd., Shenzhen (CN)

(72) Inventors: Haifeng Yu, Beijing (CN); Zhenzhen Cao, Beijing (CN); Xin Xiong, Beijing (CN); Bin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/653,542

(22) Filed: Oct. 15, 2019

(65) Prior Publication Data

US 2020/0045577 A1 Feb. 6, 2020

Related U.S. Application Data

(63) Continuation of application No. PCT/CN2018/106173, filed on Sep. 18, 2018.

(30) Foreign Application Priority Data

Sep. 28, 2017 (CN) .......................... 201710901990.X

(51) Int. Cl.
*H04W 28/02* (2009.01)
*H04W 28/06* (2009.01)
*H04W 72/12* (2009.01)

(52) U.S. Cl.
CPC ... *H04W 28/0278* (2013.01); *H04W 28/0252* (2013.01); *H04W 28/06* (2013.01); *H04W 72/1268* (2013.01)

(58) Field of Classification Search
CPC ......... H04W 28/0278; H04W 28/0252; H04W 28/06; H04W 72/1268; H04W 72/1278; H04W 72/1284; H04W 24/10
See application file for complete search history.

(56) References Cited

U.S. PATENT DOCUMENTS

2011/0242972 A1* 10/2011 Sebire .................. H04W 28/12
                                                          370/229
2011/0274044 A1* 11/2011 Park ...................... H04L 47/10
                                                          370/328

(Continued)

FOREIGN PATENT DOCUMENTS

CN          102264098 A          11/2011
CN          102291771 A          12/2011

(Continued)

OTHER PUBLICATIONS

"BSR format with increased LCG," 3GPP TSG-RAN WG2 Meeting #99, Berlin, Germany, R2-1709149, XP051318938, pp. 1-3, 3rd Generation Partnership, Project, Valbonne, France (Aug. 21-25, 2017).

(Continued)

*Primary Examiner* — Thai Nguyen
(74) *Attorney, Agent, or Firm* — Leydig, Voit & Mayer, Ltd.

(57) ABSTRACT

Embodiments of the disclosure provides a BSR communication method and a terminal device. The communication method includes: determining, by a terminal device, a quantity of LCGs currently including to-be-reported buffer data; when determining that only one LCG includes to-be-reported buffer data, determining, by the terminal device, one of a plurality of BSR formats as a first target BSR format, where the plurality of BSR formats are a plurality of formats used by the terminal device to report different BSRs based on different ranges of amount of uplink data in a buffer; and sending, by the terminal device, a target BSR to an access network device using the first target BSR format, where the target BSR is used to indicate an amount of uplink data in a buffer of the LCG.

20 Claims, 10 Drawing Sheets

(56) References Cited

U.S. PATENT DOCUMENTS

| | | | |
|---|---|---|---|
| 2012/0314672 A1 | 12/2012 | Chen | |
| 2013/0107722 A1 | 5/2013 | Huang | |
| 2015/0043352 A1 | 2/2015 | Jang et al. | |
| 2015/0358991 A1* | 12/2015 | Park | H04W 76/27 370/336 |

FOREIGN PATENT DOCUMENTS

| | | |
|---|---|---|
| CN | 103889066 A | 6/2014 |
| CN | 105491618 A | 4/2016 |
| CN | 106535246 A | 3/2017 |
| WO | 2016177221 A1 | 11/2016 |

OTHER PUBLICATIONS

"BSR format in NR," 3GPP TSG-RAN WG2 Meeting#99, Berlin, Germany, R2-1708491, pp. 1-4, 3rd Generation Partnership, Project, Valbonne, France (Aug. 21-25, 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.4.0, pp. 1-108, 3rd Generation Partnership, Project, Valbonne, France (Sep. 2017).

"Report of 3GPP TSG RAN2#99 meeting, Berlin, Germany," 3GPP TSG-RAN WG2 meeting #99bis, Prague, Czech Republic, R2-1710001, pp. 1-235, 3rd Generation Partnership, Project, Valbonne, France (Oct. 9-13, 2017).

"3rd Generation Partnership Project; Technical Specification Group Radio Access Network; Study on Scenarios and Requirements for Next Generation Access Technologies; (Release 14)," 3GPP TR 38.913 V14.3.0, pp. 1-39, 3rd Generation Partnership, Project, Valbonne, France (Jun. 2017).

"BSR procedure," 3GPP TSG-RAN WG2#99, Berlin, Germany, R2-1707722, pp. 1-4, 3rd Generation Partnership, Project, Valbonne, France (Aug. 21-25, 2017).

"3rd Generation Partnership Project;Technical Specification Group Radio Access Network;NR;Medium Access Control (MAC) protocol specification (Release 15)" 3GPP TS 38.321 V1.0.0, pp. 1-46, 3rd Generation Partnership, Project, Valbonne, France (Sep. 2017).

"Flexible length BSR format," 3GPP TSG-RAN WG2 NR #99, Berlin, Germany, R2-1707721, pp. 1-5, 3rd Generation Partnership, Project, Valbonne, France (Aug. 21-25, 2017).

"BSR MAC CE Format," 3GPP TSG-RAN WG2 #99, Berlin, Germany, R2- 1707920 (Revision of R2-1706368), pp. 1-3, 3rd Generation Partnership, Project, Valbonne, France (Aug. 21-25, 2017).

"BSR formats in NR," 3GPP TSG-RAN WG2 #99, Berlin, Germany, Tdoc R2-1708349, pp. 1-4, 3rd Generation Partnership, Project, Valbonne, France (Aug. 21-25, 2017).

* cited by examiner

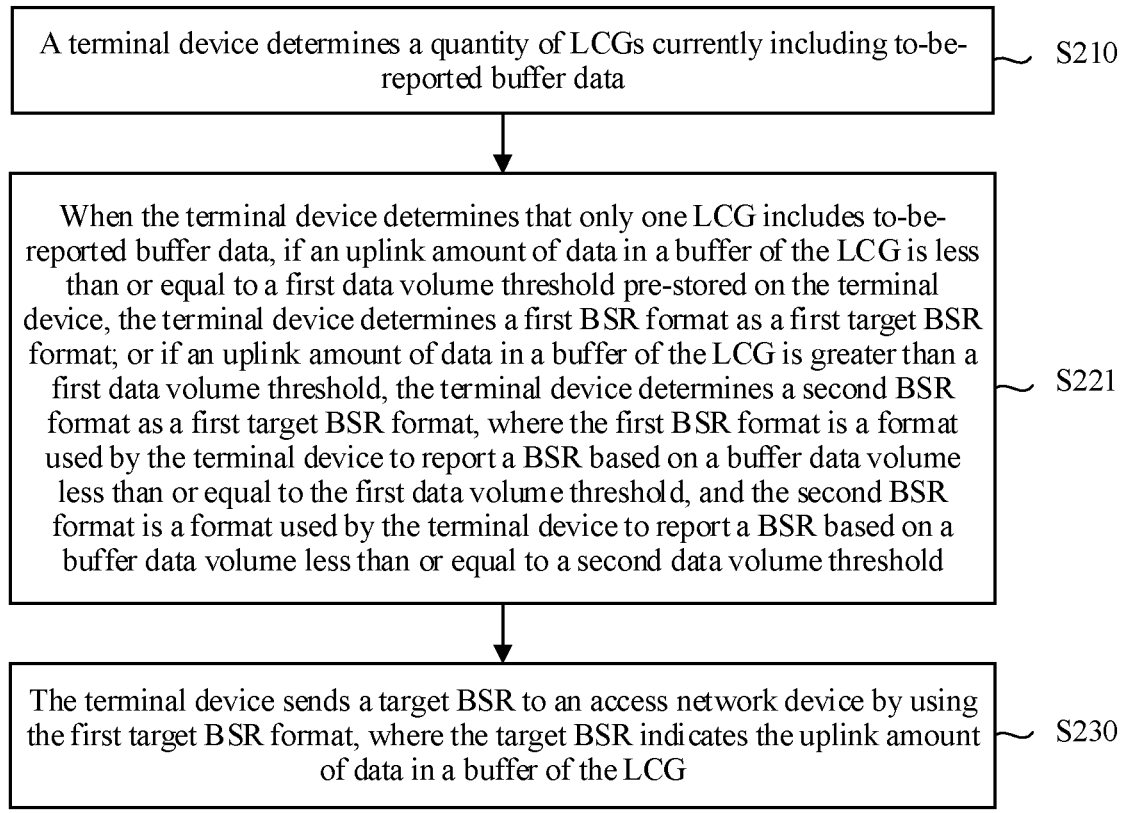
FIG. 3
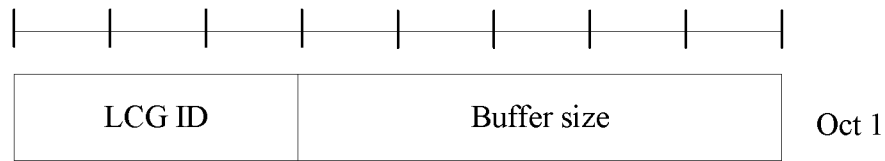
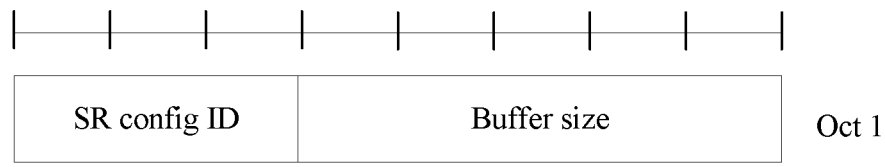
FIG. 4

An access network device receives a target BSR sent by a terminal device by using a first target BSR format, where the target BSR is used to indicate an uplink amount of data in a buffer of one LCG, the first target BSR format is a BSR format that is determined in a plurality of BSR formats when the terminal device determines that only one logical channel group LCG includes to-be-reported buffer data, and the plurality of BSR formats are a plurality of formats used by the terminal device to report different BSRs based on different ranges of uplink amount of data in a buffer ⎯ S810

FIG. 8

A terminal device determines that an LCG including to-be-reported buffer data meets at least one of the following conditions: an uplink amount of data in a buffer of the LCG is not reported within duration from a trigger moment for BSR reporting to a current moment; a time interval between a moment at which the terminal device reports an uplink amount of data in a buffer of the LCG last time and a current moment is greater than or equal to a time threshold; a data volume difference between an uplink amount of data in a buffer of the LCG reported by the terminal device last time and a current uplink amount of data in a buffer of the LCG is greater than or equal to a data volume threshold; or a highest priority of an LC in the LCG is greater than or equal to a priority threshold ⎯ S910

The terminal sends the BSR to the access network device, where the BSR is used to indicate the current uplink amount of data in a buffer of the LCG ⎯ S920

FIG. 9

Terminal device 1000

Processing module 1010 — Sending module 1020

FIG. 10

COMMUNICATION METHOD, TERMINAL DEVICE, AND ACCESS NETWORK DEVICE

CROSS-REFERENCE TO RELATED DISCLOSURES

This application is a continuation of International Application No. PCT/CN2018/106173, filed on Sep. 18, 2018, which claims priority to Chinese Patent Application No. 201710901990.X, filed on Sep. 28, 2017. The disclosures of the aforementioned disclosures are hereby incorporated by reference in their entireties.

TECHNICAL FIELD

This disclosure relates to the communications field, and more specifically, to a communication method, a terminal device, and an access network device.

BACKGROUND

In a current communications system, for example, in a long term evolution (LTE) communications system, there are four logical channel groups (LCGs). A terminal may report an amount of uplink data in a buffer of one LCG using a buffer status report (BSR) format of a length of one byte.

Specifically, two bits in the byte are used to indicate an LCG in the four LCGs, whose amount of uplink data in a buffer is reported, and the other six bits are used to indicate the amount of uplink data in a buffer of the LCG.

Increasingly diversified communications services bring more LCGs in a communications network. Therefore, more bits need to be used to indicate an LCG whose amount of uplink data in a buffer is reported.

After a data volume of one LCG increases, if an amount of uplink data in a buffer of the LCG is still reported using a BSR format of a length of one byte as it has been reported in the existing communications system, a quantity of bits in the BSR format that are used to indicate the amount of uplink data in a buffer decreases as a quantity of bits used to indicate the LCG increases. A small quantity of bits may prevent the terminal from accurately reporting a large amount of uplink data in a buffer, and consequently reporting integrity of the amount of uplink data in a buffer is affected.

Therefore, how to improve reporting integrity of an amount of uplink data in a buffer of an LCG is an urgent problem to be resolved.

SUMMARY

This disclosure provides a communication method and a terminal device, to improve reporting integrity of an amount of uplink data in a buffer of an LCG.

According to a first aspect, this disclosure provides a BSR communication method. The communication method includes: determining, by a terminal device, a quantity of logical channel groups (LCGs) currently including to-be-reported buffer data; when determining that only one LCG includes to-be-reported buffer data, determining, by the terminal device, one of a plurality of BSR formats as a first target BSR format, where the plurality of BSR formats are a plurality of formats used by the terminal device to report different BSRs based on different ranges of amount of uplink data in a buffer; and sending, by the terminal device, a target BSR to an access network device by using the first target BSR format, where the target BSR is used to indicate an amount of uplink data in a buffer of the LCG.

In the communication method, the terminal device may select an appropriate BSR format from the plurality of BSR formats to report the amount of uplink data in the buffer of the LCG, thereby improving reporting integrity.

With reference to the first aspect, in a first possible implementation, the plurality of BSR formats include a first BSR format and a second BSR format, the first BSR format is a format used by the terminal device to report a BSR based on an amount of data in a buffer less than or equal to a first data volume threshold, and the second BSR format is a format used by the terminal device to report a BSR based on an amount of data in a buffer less than or equal to a second data volume threshold.

The determining, by the terminal device, one of a plurality of BSR formats as a first target BSR format includes: when the amount of uplink data in a buffer of the LCG is less than or equal to the first data volume threshold, determining, by the terminal device, the first BSR format as the first target BSR format; or when the amount of uplink data in the buffer of the LCG is greater than the first data volume threshold, determining, by the terminal device, the second BSR format as the first target BSR format.

With reference to the first possible implementation, in a second possible implementation, a BSR sent by using the first BSR format occupies one byte, and a BSR sent by using the second BSR format occupies two or more bytes.

With reference to the second possible implementation, in a third possible implementation, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies eight bits.

With reference to the first possible implementation, in a fourth possible implementation, a BSR sent by using the first BSR format and a BSR sent by using the second BSR format each occupy one byte.

With reference to the fourth possible implementation, in a fifth possible implementation, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies five bits.

With reference to any one of the second to the fifth possible implementations, in a sixth possible implementation, the first BSR format is a short BSR format, and the second BSR format is a long BSR format; or both the first BSR format and the second BSR format are short BSR formats.

With reference to the first aspect, in a seventh possible implementation, the plurality of BSR formats include a third BSR format and a fourth BSR format. When determining that a plurality of LCGs include to-be-reported uplink buffer data, the terminal device determines whether a current uplink resource is sufficient to report uplink amounts of data in a buffer of the plurality of LCGs. When the current uplink resource is insufficient to report amount of data in a buffer information of the plurality of LCGs, if a current uplink resource quantity can accommodate only one byte, the terminal device determines the third BSR format as a second target BSR format; or if the current uplink resource can accommodate more than one bytes, the terminal device determines the fourth BSR format as a second target BSR format. The terminal device sends a truncated BSR to the access network device by using the second target BSR format, where the truncated BSR includes uplink amounts of data in a buffer of some of the plurality of LCGs. Both the third BSR format and the fourth BSR format are truncated BSR formats, the truncated BSR format is a format used by the terminal device to send the truncated BSR, and the truncated BSR is used to report the uplink amounts of data in the buffer of the some of the plurality of LCGs.

Optionally, the fourth BSR format may be the same as a flexible long BSR format.

According to a second aspect, this disclosure provides a BSR communication method, including:

receiving, by an access network device, a target BSR sent by a terminal device by using a first target BSR format, where the target BSR is used to indicate an amount of uplink data in a buffer of the one LCG.

The first target BSR format is a BSR format that is determined in a plurality of BSR formats when the terminal device determines that only one logical channel group LCG includes to-be-reported buffer data, and the plurality of BSR formats are a plurality of formats used by the terminal device to report different BSRs based on different ranges of amount of uplink data in a buffer.

In the communication method, the access network device may receive a BSR flexibly sent by the terminal device, thereby improving reporting integrity of an amount of uplink data in a buffer.

With reference to the second aspect, in a first possible implementation, the plurality of BSR formats include a first BSR format and a second BSR format, the first BSR format is a format used by the terminal device to report a BSR based on an amount of data in a buffer less than or equal to a first data volume threshold, and the second BSR format is a format used by the terminal device to report a BSR based on an amount of data in a buffer less than or equal to a second data volume threshold.

With reference to the first possible implementation, in a second possible implementation, a BSR sent by using the first BSR format occupies one byte, and a BSR sent by using the second BSR format occupies two or more bytes.

With reference to the second possible implementation, in a third possible implementation, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies eight bits.

With reference to the first possible implementation, in a fourth possible implementation, a BSR sent by using the first BSR format and a BSR sent by using the second BSR format each occupy one byte.

With reference to the fourth possible implementation, in a fifth possible implementation, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies five bits.

With reference to any one of the second to the fifth possible implementations, in a sixth possible implementation, the first BSR format is a short BSR format, and the second BSR format is a long BSR format; or both the first BSR format and the second BSR format are short BSR formats.

With reference to the first aspect, in a seventh possible implementation, the plurality of BSR formats include a third BSR format and a fourth BSR format, and the communication method further includes:

receiving, by the access network device, a BSR sent by the terminal device by using a second target BSR format.

When a current uplink resource is insufficient to report amount of data in a buffer information of the plurality of LCGs, if a current uplink resource quantity can accommodate only one byte, the second target BSR format is the third BSR format; or if the current uplink resource can accommodate more than one bytes, the second target BSR format is the fourth BSR format.

Both the third BSR format and the fourth BSR format are truncated BSR formats, the truncated BSR format is a format used by the terminal device to send a truncated BSR, and the truncated BSR is used to report uplink amounts of data in a buffer of some of the plurality of LCGs.

According to a third aspect, this disclosure provides a BSR communication method. The communication method includes: determining, by a terminal device, that a logical channel group LCG including to-be-reported buffer data meets at least one of the following conditions: an amount of uplink data in a buffer of the LCG is not reported within duration from a trigger moment for BSR reporting to a current moment; a time interval between a moment at which the terminal device reports an amount of uplink data in a buffer of the LCG last time and a current moment is greater than or equal to a time threshold; a data volume difference between an amount of uplink data in a buffer of the LCG reported by the terminal device last time and a current amount of uplink data in a buffer of the LCG is greater than or equal to a data volume threshold; or a highest priority of a logical channel LCH in the LCG is greater than or equal to a priority threshold; and sending, by the terminal device, the BSR to an access network device, where the BSR is used to indicate the current amount of uplink data in a buffer of the LCG.

In the communication method, the terminal device reports the amount of uplink data in a buffer to the access network device only under a specific condition, to avoid unnecessary reporting, thereby saving resources.

With reference to the third aspect, in a first possible implementation, the determining, by the terminal, that an amount of uplink data in a buffer of the LCG is not reported within duration from a trigger moment for BSR reporting to a current moment includes: when determining that an indication information set does not include indication information of the LCG, determining, by the terminal device, that the amount of uplink data in a buffer of the LCG is not reported within the duration from the trigger moment for BSR reporting to the current moment, where indication information in the indication information set is used to indicate an LCG whose amount of uplink data in a buffer is reported.

With reference to the first possible implementation, in a second possible implementation, after the sending, by the terminal device, the BSR to an access network device, the communication method further includes: adding, by the terminal device to the indication information set, indication information used to indicate that the amount of uplink data in a buffer of the LCG is reported.

According to a fourth aspect, this disclosure provides a terminal device. The terminal device includes a module configured to perform the communication method in any one of the first aspect or the possible implementations of the first aspect. The module included in the terminal device may be implemented in a software and/or hardware manner.

According to a fifth aspect, this disclosure provides an access network device. The access network device includes a module configured to perform the communication method in any one of the second aspect or the possible implementations of the second aspect. The module included in the access network device may be implemented in a software and/or hardware manner.

According to a sixth aspect, this disclosure provides a terminal device. The terminal device includes a module configured to perform the communication method in any one of the third aspect or the possible implementations of the third aspect. The module included in the terminal device may be implemented in a software and/or hardware manner.

According to a seventh aspect, this disclosure provides a terminal device. The terminal device includes a processor and a transmitter. The processor is configured to execute a program. When the processor executes code, the processor and the transmitter implement the communication method in any one of the first aspect or the possible implementations of the first aspect.

Optionally, the terminal device may further include a receiver, and the receiver is configured to receive information sent by an access network device.

Optionally, the terminal device may further include a memory, and the memory is configured to store the code executed by the processor.

According to an eighth aspect, this disclosure provides an access network device. The access network device includes a processor and a receiver. The processor is configured to execute a program. When the processor executes code, the processor and the receiver implement the communication method in any one of the second aspect or the possible implementations of the second aspect.

Optionally, the access network device may further include a transmitter, and the transmitter is configured to send information to a terminal device.

Optionally, the access network device may further include a memory, and the memory is configured to store the code executed by the processor.

According to a ninth aspect, this disclosure provides a terminal device. The terminal device includes a processor and a transmitter. The processor is configured to execute a program. When the processor executes code, the processor and the transmitter implement the communication method in any one of the third aspect or the possible implementations of the third aspect.

Optionally, the terminal device may further include a receiver, and the receiver is configured to receive information sent by an access network device.

Optionally, the terminal device may further include a memory, and the memory is configured to store the code executed by the processor.

According to a tenth aspect, this disclosure provides a computer readable storage medium. The computer readable storage medium stores program code executed by a terminal device. The program code includes an instruction used to perform the communication method in any one of the first aspect or the possible implementations of the first aspect.

According to an eleventh aspect, this disclosure provides a computer readable storage medium. The computer readable storage medium stores program code executed by an access network device. The program code includes an instruction used to perform the communication method in any one of the second aspect or the possible implementations of the second aspect.

According to a twelfth aspect, this disclosure provides a computer readable storage medium. The computer readable storage medium stores program code executed by a terminal device. The program code includes an instruction used to perform the communication method in any one of the third aspect or the possible implementations of the third aspect.

According to a thirteenth aspect, this disclosure provides a computer program product that includes an instruction. When the computer program product runs on a terminal device, the terminal device is enabled to perform the communication method in any one of the first aspect or the possible implementations of the first aspect.

According to a fourteenth aspect, this disclosure provides a computer program product that includes an instruction. When the computer program product runs on an access network device, the access network device is enabled to perform the communication method in any one of the second aspect or the possible implementations of the second aspect.

According to a fifteenth aspect, this disclosure provides a computer program product that includes an instruction. When the computer program product runs on a terminal device, the terminal device is enabled to perform the communication method in any one of the third aspect or the possible implementations of the third aspect.

According to a sixteenth aspect, this disclosure provides a chip system. The chip system includes a processor, configured to support a terminal device or an access network device in implementing functions in the foregoing corresponding aspects, for example, generating or processing information in the foregoing communication methods.

In a possible design, the chip system further includes a memory. The memory is configured to store a program instruction and data that are necessary for the terminal device or the access network device. The chip system may include a chip, or may include a chip and another discrete device.

DESCRIPTION OF DRAWINGS

FIG. 3 is a detailed schematic diagram of S220 in the communication method shown in FIG. 2;

FIG. 4 is a schematic structural diagram of a BSR format according to an embodiment of this disclosure;

FIG. 8 is a schematic flowchart of a communication method according to another embodiment of this disclosure;

FIG. 9 is a schematic flowchart of a communication method according to another embodiment of this disclosure;

FIG. 10 is a schematic structural diagram of a terminal device according to an embodiment of this disclosure;

DESCRIPTION OF EMBODIMENTS

The following describes technical solutions of this disclosure with reference to accompanying drawings.

Figure 1:
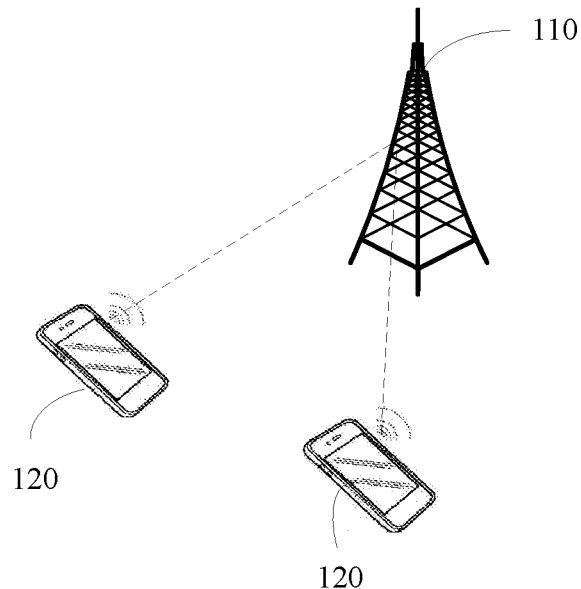
FIG. 1 is a schematic diagram of an architecture of a communications system to which a communication method according to an embodiment of this disclosure can be applied.

FIG. 1 is a schematic diagram of an architecture of a communications system to which a communication method according to an embodiment of this disclosure can be applied. The communications system shown in FIG. 1 may include an access network device 110 and a terminal device 120.

An example of the communications system shown in FIG. 1 is a 5G communications system. It should be understood that the embodiments of this disclosure are not limited to the system architecture shown in FIG. 1. In addition, the device in FIG. 1 may be hardware, or may be software obtained through function division, or a combination thereof.

The access network device 110 may be specifically a radio access network (Radio Access Network, RAN) device. For example, the access network device 110 is a base station (Base Station, BS).

The base station, also referred to as a base station device, is a device that connects a terminal and a wireless network, and includes but is not limited to a transmission reception point (TRP), a 5G NodeB (gNB), an evolved NodeB (eNB), a radio network controller (RNC), a NodeB (NB), a base station controller (BSC), a base transceiver station (BTS), a home eNodeB (HeNB or HNB), a baseband unit (BBU), a Wi-Fi access point (AP), or a pico.

It should be understood that a specific type of the base station is not limited in the embodiments of this disclosure. In systems using different radio access technologies, devices having functions of the base station may have different names. For ease of description, in all the embodiments of this disclosure, all the foregoing apparatuses that provide a wireless communication function for the terminal are referred to as the base station.

The terminal device 120 may be user equipment (UE). The terminal device 120 may communicate with one or more core networks (CN) by using the access network device 110. The terminal may be referred to as an access terminal, a terminal, a subscriber unit, a subscriber station, a mobile station, a mobile console, a remote station, a remote terminal, a mobile device, a user terminal, a radio access network device, a user agent, or a user apparatus. The terminal may be a cellular phone, a cordless telephone set, a session initiation protocol (SIP) phone, a wireless local loop (WLL) station, a personal digital assistant (PDA), a handheld device having a wireless communication function, a computing device or another device connected to a wireless modem, an in-vehicle device, a wearable device, a terminal device in the Internet of Things or the Internet of Vehicles, a terminal device in any form in a future network, or the like.

Figure 2:
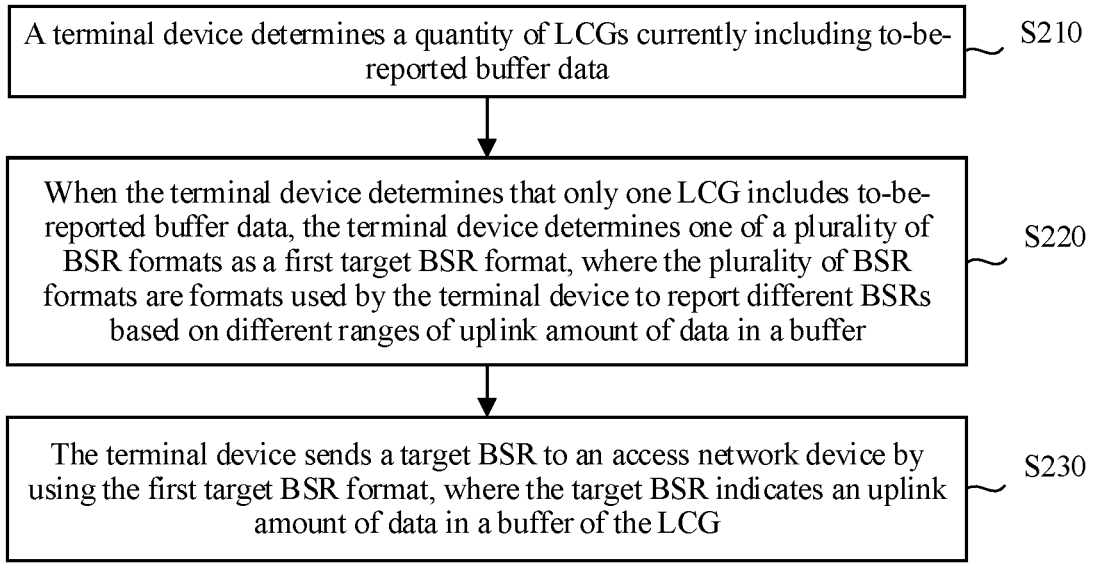
FIG. 2 is a schematic flowchart of a communication method according to an embodiment of this disclosure.

FIG. 2 is a schematic flowchart of a communication method according to an embodiment of this disclosure. It should be understood that FIG. 2 shows steps or operations of the communication method, but these steps or operations are merely an example. In this embodiment of this disclosure, other operations or variations of the operations in FIG. 2 may be performed. The communication method shown in FIG. 2 may include S210, S220, and S230.

S210. A terminal device determines a quantity of LCGs currently including to-be-reported buffer data. In other words, the terminal device determines a quantity of LCGs whose amounts of data in a buffer currently need to be reported to an access network device.

S220. When the terminal device determines that only one LCG includes to-be-reported buffer data, the terminal device determines one of a plurality of BSR formats as a first target BSR format, where different ranges of uplink amounts of data in a buffer are reported by the terminal device based on the plurality of BSR formats.

In other words, BSRs in the plurality of BSR formats are used to report uplink amounts of data in a buffer in different data volume ranges.

For example, in BSRs in different BSR formats in the plurality of BSR formats, different quantities of bits or a same quantity of bits is used to indicate the amount of uplink data in a buffer, but corresponding buffer size levels are different.

In S220, the terminal may determine one of the plurality of BSR formats as the first target BSR format used to report an amount of uplink data in a buffer of the LCG, and the BSRs in the plurality of BSR formats are respectively used to indicate uplink amounts of data in a buffer in different data volume ranges. Therefore, the terminal may determine an appropriate BSR format to report the amount of uplink data in a buffer of the LCG, thereby improving reporting integrity of the amount of uplink data in a buffer of the LCG.

In S220, that different ranges of uplink amounts of data in a buffer are reported by the terminal device based on the plurality of BSR formats may indicate that when the terminal device reports the amount of uplink data in a buffer by using any one of the plurality of BSR formats, a maximum amount of uplink data in a buffer that can be reported by the terminal is different from a maximum amount of uplink data in a buffer that can be reported by the terminal device by using another BSR format in the plurality of BSR formats.

For example, the plurality of BSR formats include two BSR formats. When the terminal device reports uplink buffer data based on one BSR format, the amount of uplink data in a buffer that can be reported by the terminal device is an amount of uplink data in a buffer less than or equal to a first data volume threshold. In other words, the maximum amount of uplink data in a buffer that can be reported by the terminal is equal to the first data volume threshold. When the terminal device reports uplink buffer data based on the other BSR format, the amount of uplink data in a buffer that can be reported by the terminal device is an amount of uplink data in a buffer less than or equal to a second data volume threshold. In other words, the maximum amount of uplink data in a buffer that can be reported by the terminal device is equal to the second data volume threshold.

The first data volume threshold may be less than the second data volume threshold.

For example, the first data volume threshold is 1326 bytes, and the second data volume threshold is 15000 bytes.

For ease of subsequent description, a BSR format in which the maximum amount of uplink data in a buffer that can be reported is the amount of uplink data in a buffer less than or equal to the first data volume threshold is referred to as a second BSR, and a BSR format in which the maximum amount of uplink data in a buffer that can be reported is the amount of uplink data in a buffer less than or equal to the second data volume threshold is referred to as a second BSR format.

As shown in FIG. 3, when the plurality of BSR formats in S220 include the first BSR format and the second BSR format, a possible implementation of S220 is S221.

S221. When the terminal device determines that only one LCG includes to-be-reported buffer data, if an amount of uplink data in a buffer of the LCG is less than or equal to a first data volume threshold, the terminal device determines the first BSR format as the first target BSR format; or if an amount of uplink data in a buffer of the LCG is greater than a first data volume threshold, the terminal device determines the second BSR format as the first target BSR format.

For example, when the first BSR format is used to report an amount of uplink data in a buffer less than or equal to 1326 bytes and the second BSR format is used to report an amount of uplink data in a buffer less than or equal to 15000 bytes, if the amount of uplink data in a buffer of the LCG is less than or equal to 1326 bytes, the terminal device determines the first BSR format as the first target BSR format; or if the amount of uplink data in a buffer of the LCG is greater than 1326 bytes, the terminal device determines the second BSR format as the first target BSR format.

Optionally, the first data volume threshold may be pre-stored on the terminal device, in other words, preconfigured on the terminal device according to a communication protocol. Alternatively, after receiving configuration information sent by the access network device, the terminal device may store the first data volume threshold from the configuration information. The configuration information includes a system message, an RRC message, a MAC CE, a PDCCH, or the like.

The terminal device may receive the configuration information sent by the access network device by using the system message, the radio resource control (RRC) message, the media access control (MAC) control element (CE), the physical downlink control channel (PDCCH), or the like.

The following specifically describes how the terminal device indicates different data volume ranges based on the first BSR format and the second BSR format.

Optionally, in a BSR sent by the terminal device by using the first BSR format and a BSR sent by the terminal device by using the second BSR format, different quantities of bits may be used to indicate the amount of uplink data in a buffer of the LCG.

For example, in the BSR sent by the terminal device by using the first BSR format, five bits may be used to indicate the amount of uplink data in a buffer of the LCG, and in the BSR sent by the terminal device by using the second BSR format, eight bits may be used to indicate the amount of uplink data in a buffer of the LCG. Because a maximum value that can be represented by the eight bits is greater than a maximum value that can be represented by the five bits, a maximum amount of uplink data in a buffer that can be indicated by the BSR sent by the terminal by using the second BSR format is greater than a maximum amount of uplink data in a buffer that can be indicated by the BSR sent by the terminal by using the first BSR format. In other words, the second data volume threshold is greater than the first data volume threshold.

Figure 5:
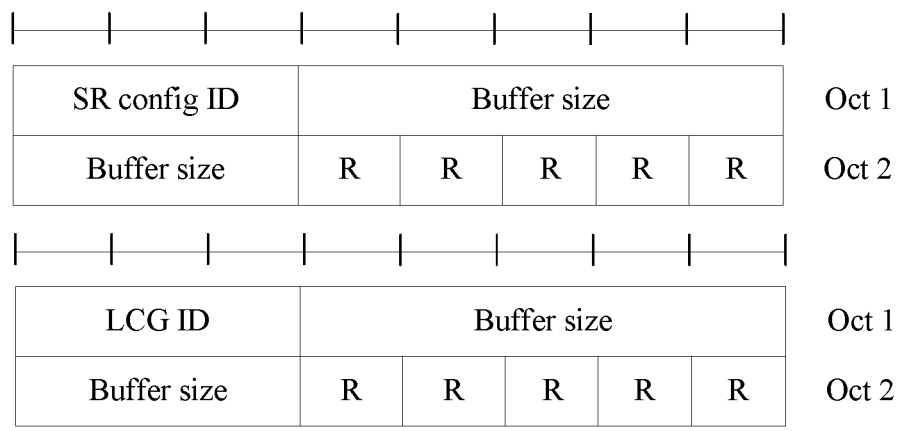
FIG. 5 is a schematic structural diagram of a BSR format according to another embodiment of this disclosure.
Figure 6:
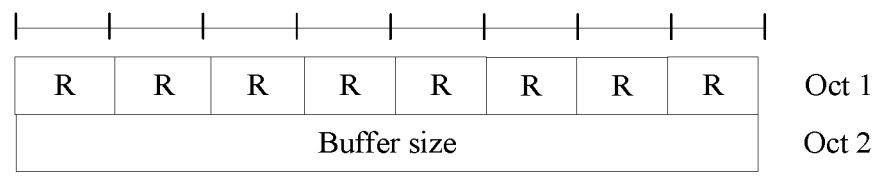
FIG. 6 is a schematic structural diagram of a BSR format according to another embodiment of this disclosure.

In the BSR sent by the terminal device by using the first BSR format and the BSR sent by the terminal by using the second BSR format, when different quantities of bits are used to indicate the amount of uplink data in a buffer of the LCG, FIG. 4 shows an example of the BSR in the first BSR format, and FIG. 5 and FIG. 6 show examples of the BSR in the second BSR format.

The BSR in the first BSR format shown in FIG. 4 occupies one byte. A first field in the first BSR format is used to indicate the amount of uplink data in a buffer of the LCG, and the first field occupies five bits.

It should be understood that the five bits used to indicate the amount of uplink data in a buffer in FIG. 4 are merely an example, and should not be construed as any limitation on this disclosure. For example, six bits, seven bits, or eight bits may be used. In addition, locations of the five bits used to indicate the amount of uplink data in a buffer in FIG. 4 are also an example. This embodiment of this disclosure does not limit locations of these bits. For example, first five bits in the BSR in the first BSR format may be used to indicate the amount of uplink data in a buffer of the LCG.

Optionally, in FIG. 4, the other three bits in the byte occupied by the BSR in the first BSR format may be used to indicate the LCG. For example, the three bits may be used to indicate an identifier (ID) of the LCG or a resource scheduling request (SR) configuration information (config) identifier corresponding to the LCG, to indicate a resource request configuration group whose corresponding amount of uplink data in a buffer is reported. Certainly, the three bits may carry another identifier.

The BSR in the first BSR format shown in FIG. 4 may be a short BSR of a length of one byte.

The BSR in the second BSR format shown in FIG. 5 occupies two bytes. A field in the two bytes that is used to indicate the amount of uplink data in a buffer of the LCG is a second field, and the second field may be eight bits.

It should be understood that the eight bits used to indicate the amount of uplink data in a buffer in FIG. 5 are merely an example, and should not be construed as any limitation on this disclosure. For example, six bits or seven bits may be used. In addition, locations of the eight bits used to indicate the amount of uplink data in a buffer in FIG. 5 are also an example. This embodiment of this disclosure does not limit locations of these bits. For example, the first eight bits in the BSR in the second BSR format may be used to indicate the amount of uplink data in a buffer of the LCG.

The second BSR format in FIG. 5 includes a BS report identifier, a BS corresponding to the BS report identifier, and reserved bits. The BS report identifier may be a logical channel group LCG identifier, an SR configuration identifier, or the like. The BS report identifier occupies three bits, the BS corresponding to the BS report identifier occupies eight bits, and the reserved bits are five bits. The BSR in the second BSR format shown in FIG. 5 may be a long BSR of a length of two bytes, for example, a BSR in a flexible long BSR format.

The BSR in the second BSR format shown in FIG. 6 also occupies two bytes. A total of eight bits in the two bytes are used to indicate the amount of uplink data in a buffer of the LCG.

Different from the BSR in the second BSR format shown in FIG. 5, the BSR in the second BSR format in FIG. 6 occupy the first eight bits in the two bytes to indicate the LCG, and there is no reserved bit.

The eight bits in the BSR in the second BSR format shown in FIG. 6 that are used to indicate the LCG may be used to indicate an LCG whose amount of uplink data in a buffer is reported in a bitmap manner. For example, when there are eight LCGs in total, a value of the third bit in the eight bits is "1", and the other bits are all "0", it indicates that an amount of uplink data in a buffer of the third LCG is reported in the BSR in the second BSR format.

The BSR in the second BSR format shown in FIG. 6 may be a long BSR of a length of two bytes, for example, a BSR in a flexible long BSR format.

The BSR in the first BSR format may include the first field, and the first field is used to indicate a reported amount of uplink data in a buffer. The BSR in the second BSR format may include the second field, and the second field is used to indicate a reported amount of uplink data in a buffer.

With reference to Table 1, the following uses an example in which the first field includes five bits, the second field includes six bits, the first data volume threshold is 1326 bytes, and the second data volume threshold is greater than 15000 bytes, to describe how to indicate the amount of uplink data in a buffer of the LCG by using the first field in the BSR in the first BSR format and the second field in the BSR in the second BSR format.

In Table 1, a buffer size (BS) represents an amount of uplink data in a buffer range, the BS is in a unit of byte, an index represents an indirect indication for buffering the amount of uplink data in a buffer, and a corresponding BS field of the index in the BSR represents a corresponding byte value.

For example, when the amount of uplink data in a buffer of the LCG is 1000 bytes, the first BSR format may be used because 1000 bytes are less than 1326 bytes. In Table 1, an index corresponding to a range "967<BS≤1132" to which 1000 bytes belong is 31, and therefore the first field in the BSR in the first BSR format may be "11111".

For another example, when the amount of uplink data in a buffer of the LCG is 2300 bytes, the second BSR format may be used because 2300 bytes are greater than 1326 bytes. In Table 1, an index corresponding to a range "2127<BS≤2490" to which 2300 bytes belong is 36, and therefore the second field in the BSR in the second BSR may be "100011".

TABLE 1

Amount of uplink data in a buffer mapping table

| Index | BS value | Index | BS |
|---|---|---|---|
| 0 | BS = 0 | 32 | 1132 < BS ≤ 1326 |
| 1 | 0 < BS ≤ 10 | 33 | 1326 < BS ≤ 1552 |

TABLE 1-continued

Amount of uplink data in a buffer mapping table

| Index | BS value | Index | BS |
|---|---|---|---|
| 2 | 10 < BS ≤ 12 | 34 | 1552 < BS ≤ 1817 |
| 3 | 12 < BS ≤ 14 | 35 | 1817 < BS ≤ 2127 |
| 4 | 14 < BS ≤ 17 | 36 | 2127 < BS ≤ 2490 |
| 5 | 17 < BS ≤ 19 | 37 | 2490 < BS ≤ 2915 |
| 6 | 19 < BS ≤ 22 | 38 | 2915 < BS ≤ 3413 |
| 7 | 22 < BS ≤ 26 | 39 | 3413 < BS ≤ 3995 |
| 8 | 26 < BS ≤ 31 | 40 | 3995 < BS ≤ 4677 |
| 9 | 31 < BS ≤ 36 | 41 | 4677 < BS ≤ 5476 |
| 10 | 36 < BS ≤ 42 | 42 | 5476 < BS ≤ 6411 |
| 11 | 42 < BS ≤ 49 | 43 | 6411 < BS ≤ 7505 |
| 12 | 49 < BS ≤ 57 | 44 | 7505 < BS ≤ 8787 |
| 13 | 57 < BS ≤ 67 | 45 | 8787 < BS ≤ 10287 |
| 14 | 67 < BS ≤ 78 | 46 | 10287 < BS ≤ 12043 |
| 15 | 78 < BS ≤ 91 | 47 | 12043 < BS ≤ 14099 |
| 16 | 91 < BS ≤ 107 | 48 | 14099 < BS ≤ 16507 |
| 17 | 107 < BS ≤ 125 | 49 | 16507 < BS ≤ 19325 |
| 18 | 125 < BS ≤ 146 | 50 | 19325 < BS ≤ 22624 |
| 19 | 146 < BS ≤ 171 | 51 | 22624 < BS ≤ 26487 |
| 20 | 171 < BS ≤ 200 | 52 | 26487 < BS ≤ 31009 |
| 21 | 200 < BS ≤ 234 | 53 | 31009 < BS ≤ 36304 |
| 22 | 234 < BS ≤ 274 | 54 | 36304 < BS ≤ 42502 |
| 23 | 274 < BS ≤ 321 | 55 | 42502 < BS ≤ 49759 |
| 24 | 321 < BS ≤ 376 | 56 | 49759 < BS ≤ 58255 |
| 25 | 376 < BS ≤ 440 | 57 | 58255 < BS ≤ 68201 |
| 26 | 440 < BS ≤ 515 | 58 | 68201 < BS ≤ 79846 |
| 27 | 515 < BS ≤ 603 | 59 | 79846 < BS ≤ 93479 |
| 28 | 603 < BS ≤ 706 | 60 | 93479 < BS ≤ 109439 |
| 29 | 706 < BS ≤ 826 | 61 | 109439 < BS ≤ 128125 |
| 30 | 826 < BS ≤ 967 | 62 | 128125 < BS ≤ 150000 |
| 31 | 967 < BS ≤ 1132 | 63 | >150000 |

It can be learned from the foregoing examples that an uplink buffer data mapping table corresponding to the first BSR format may be a part of a buffer size table corresponding to the second BSR format.

Alternatively, the first BSR format and the second BSR format may share a buffer size table (BS table), but the first BSR format may be indicated in only a part of content in the buffer size table.

Optionally, the BS table may be specified in a protocol, or may be configured by the access network device. Different TB granularities or broadband parts (BWP) have corresponding BS tables, and a correspondence between a BWP and a BS table may be preconfigured. The BWP may be understood as a part of a carrier, and includes several contiguous physical resource blocks (PRBs). When power saving is considered or an excessively large bandwidth is not required, the terminal device may use a relatively narrow BWP. If different TB granularities or BWPs correspond to different BS tables, the UE may use a BS table corresponding to a BWP used by the UE.

Optionally, in the BSR in the first BSR format and the BSR in the second BSR format, a same quantity of bits may be used to indicate the amount of uplink data in a buffer of the LCG Optionally, the BSR in the first BSR format and the BSR in the second BSR format each may occupy one byte. When the BSR in the first BSR format and the BSR in the second BSR format each occupy one byte, both the first BSR format and the second BSR format may be short BSR formats.

When the BSR in the first BSR format and the BSR in the second BSR format each occupy one byte, five bits in each byte may be used to indicate the amount of uplink data in a buffer of the LCG. In this case, an example of the BSR in the first BSR format is shown in FIG. 4, and an example of the BSR in the second BSR format is shown in FIG. 4. A first field in the first BSR format occupies five bits, and a second field in the second BSR format also occupies five bits.

When a same quantity of bits in the BSR in the first BSR format and the BSR in the second BSR format is used to indicate the amount of uplink data in a buffer of the LCG the same quantity of bits may be used to indicate uplink amounts of data in a buffer in different data volume ranges in the following manner: When a value of the first field is equal to a value of the second field, an amount of uplink data in a buffer corresponding to the value of the first field is different from an amount of uplink data in a buffer corresponding to the value of the second field.

For example, when both bit values of the first field and the second field are "10010", the first field may indicate that the amount of uplink data in a buffer of the LCG is greater than 321 bytes and is less than or equal to 376 bytes, and the second field may indicate that amount of uplink data in a buffer of the LCG is greater than 200 bytes and less than or equal to 500 bytes.

The following describes how to use a same quantity of bits in the BSR in the first BSR format and the BSR in the second BSR format to indicate different ranges of uplink amounts of data in a buffer.

A correspondence between a bit value of the first field in the BSR in the first BSR format and an amount of uplink data in a buffer and a correspondence between a bit value of the first field in the BSR in the first BSR format and an amount of uplink data in a buffer may be predetermined.

Generally, bit values of the first field and the second field each correspond to one amount of uplink data in a buffer range. When $B_k$ represents a maximum value in an amount of uplink data in a buffer range corresponding to one bit value, the following relationship between a decimal value p corresponding to the bit value and $B_k$ may be met:

$$B_k = B_{min}\lceil(1+p)^k\rceil, \text{ where}$$

$B_{min}$ represents a minimum amount of uplink data in a buffer that can be indicated by a BSR format, and k is a variable.

When p remains unchanged, different values of k correspond to different values of $B_k$. In other words, when the bit values of the first field and the second field are the same, the same bit values correspond to different ranges of amount of uplink data in a buffer because of different values of k.

k may be referred to as a granularity or a BS step (step) of an uplink amount of data in a buffer indicated by each of the BSR in the first BSR format and the BSR in the second BSR format. In other words, when a same quantity of bits in the BSR in the first BSR format and the BSR in the second BSR format is used to indicate the amount of uplink data in a buffer, granularities are different.

S230. The terminal device sends a target BSR to the access network device by using the first target BSR format, where the target BSR indicates the amount of uplink data in a buffer of the LCG The amount of uplink data in a buffer of the LCG may be a sum of uplink amounts of data in a buffer on all logical channels (LCH) included in the LCG For example, there are eight LCGs in total. When only the third LCG includes to-be-reported buffer data, and an amount of uplink data in a buffer of the third LCG is 2300 bytes, the terminal may send the target BSR by using the second BSR format, and the target BSR indicates that the amount of uplink data in a buffer of the third LCG is 2300 bytes.

Figure 7:
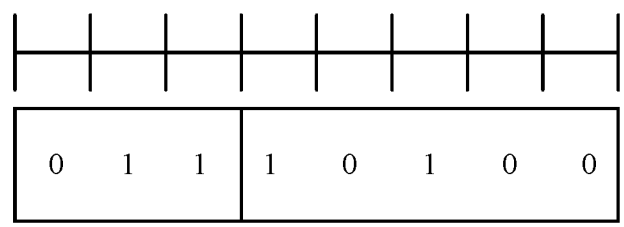
FIG. 7 is a schematic structural diagram of a BSR format according to another embodiment of this disclosure.

When the target BSR is the BSR in the second BSR format shown in FIG. 4, the target BSR may include content shown in FIG. 7.

In S230, optionally, a MAC subheader of the target BSR may further include an LCID, and the LCID is used to indicate a BSR format used for the target BSR.

In the communication method shown in FIG. 2, optionally, the plurality of BSR formats further include a third BSR format and a fourth BSR format, and both the third BSR format and the fourth BSR format are truncated BSR formats. A truncated BSR sent by the terminal device by using the truncated BSR format is used to report uplink amounts of data in a buffer of some of LCGs in all the LCGs including to-be-reported buffer data.

Correspondingly, the communication method shown in FIG. 2 may further include: when determining that a plurality of LCGs include to-be-reported uplink buffer data, determining, by the terminal device, whether a current uplink resource is sufficient to report uplink amounts of data in a buffer of the plurality of LCGs; when the current uplink resource is insufficient to report amount of data in a buffer information of the plurality of LCGs, if a current uplink resource quantity can accommodate only one byte, determining, by the terminal device, the third BSR format as a second target BSR format; otherwise, determining, by the terminal device, the fourth BSR format as a second target BSR format; and sending, by the terminal device, the truncated BSR to the access network device by using the second target BSR format, where the truncated BSR includes the reported uplink amounts of data in a buffer of the some of the plurality of LCGs.

Optionally, both the third BSR format and the fourth BSR format are truncated BSR formats, a BSR sent by using the third BSR format occupies one byte, and a BSR sent by using the fourth BSR format occupies two or more bytes. A third field that is in the BSR sent by using the third BSR format and that is used to indicate a reported amount of uplink data in a buffer occupies five bits, and a fourth field that is in the BSR sent by using the fourth BSR format and that is used to indicate a reported amount of uplink data in a buffer occupies eight bits.

It may be understood that the third field occupying five bits is merely an example, and a quantity of actually occupied bits is not limited. In addition, the fourth field occupying eight bits is also an example, and a quantity of actually occupied bits may be another value.

Optionally, the third BSR format is a short BSR format, and the fourth BSR format may be the same as a long BSR format.

Optionally, an amount of uplink data in a buffer of each LCG may be reported by using a long BSR format with the following structures:

(1) LCG ID+BS: Only an LCG including to-be-sent data is reported, and the LCG ID is used to indicate "presence of BS for LCG"; and (2) bitmap+BS: Only an LCG including to-be-sent data is reported, and the bitmap is used to indicate "presence of BS for LCG".

It may be understood that the LCG ID described above may be another form of ID, for example, an SR configuration ID.

Correspondingly, when the truncated BSR is used to report a BS of each LCG, a structure that is the same as a structure for reporting the BS of each LCG by using a long BSR is used.

Figures 23, 24:
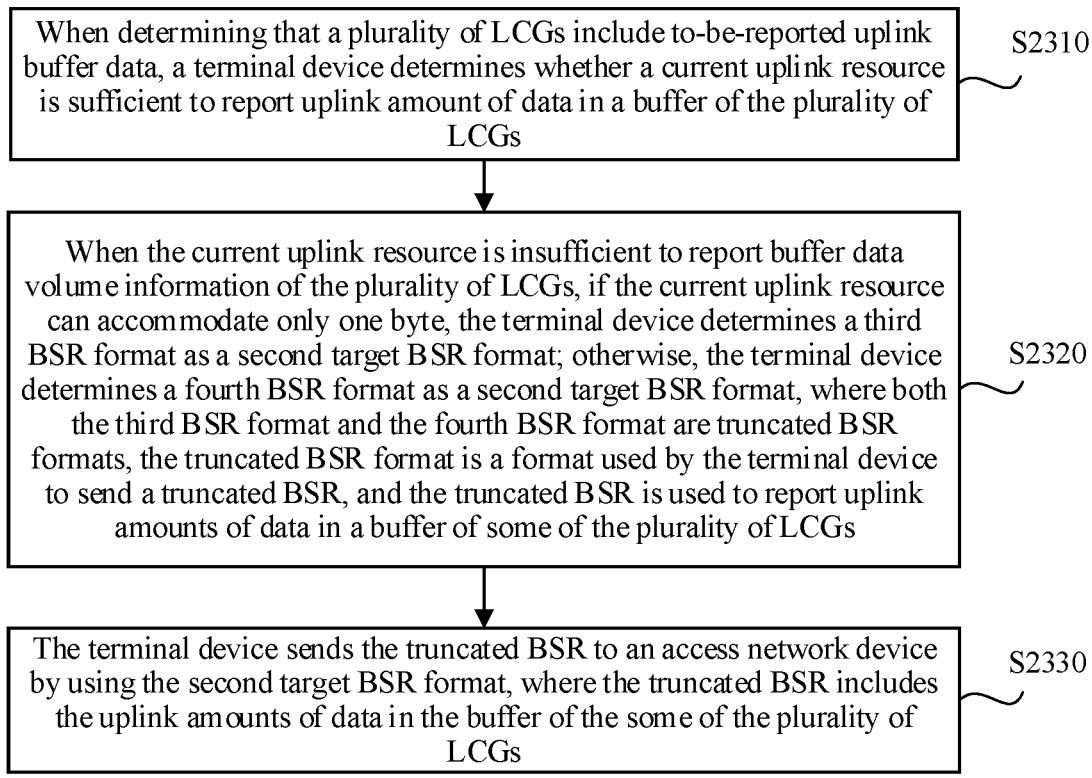
FIG. 23 is a schematic flowchart of a communication method according to another embodiment of this disclosure.
FIG. 24 is a schematic flowchart of a communication method according to another embodiment of this disclosure.

As shown in FIG. 23, this disclosure further provides a BSR reporting communication method. The communication method includes the following steps: S2310. When determining that a plurality of LCGs include to-be-reported uplink buffer data, a terminal device determines whether a current uplink resource is sufficient to report uplink amounts of data in a buffer of the plurality of LCGs. S2320. When the current uplink resource is insufficient to report amount of data in a buffer information of the plurality of LCGs, if the current uplink resource can accommodate only one byte, the terminal device determines a third BSR format as a second target BSR format; otherwise, the terminal device determines a fourth BSR format as a second target BSR format. S2330. The terminal device sends a truncated BSR to an access network device by using the second target BSR format, where the truncated BSR includes uplink amounts of data in a buffer of some of the plurality of LCGs, both the third BSR format and the fourth BSR format are truncated BSR formats, the truncated BSR format is a format used by the terminal device to send the truncated BSR, and the truncated BSR is used to report the uplink amounts of data in a buffer of the some of the plurality of LCGs.

The current uplink resource may be a resource requested by the terminal from the access network device for BSR transmission, or may be a resource that remains after the terminal transmits uplink data. Alternatively, the current uplink resource may be a resource used to report the amount of data in a buffer information of the plurality of LCGs.

The third BSR format may be a short truncated BSR format. The fourth BSR format may be a long truncated BSR format.

In some possible implementations, a BSR sent by using the third BSR format may occupy one byte, and a BSR sent by using the fourth BSR format may occupy two or more bytes.

In some possible implementations, the third BSR format includes a third field, the third field may occupy five bits, and the third field is used to indicate an amount of uplink data in a buffer of one of the some of LCGs.

Figure 16:
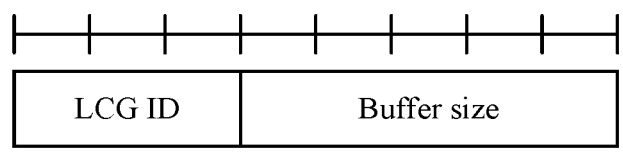
FIG. 16 is a schematic structural diagram of a BSR format according to another embodiment of this disclosure.

FIG. 16 shows an example of the third BSR format. As shown in FIG. 16, an LCG ID represents a logical channel group identifier, and a buffer size represents a size of an amount of uplink data in a buffer of an LCG corresponding to the LCG ID. The buffer size may be an index value, and there is a correspondence between the index value and an amount of uplink data in a buffer range. The terminal device may determine a value, namely, an index value, of a buffer size in a short truncated BSR based on the correspondence and a to-be-sent amount of uplink data in a buffer of the terminal device.

When a remaining resource is insufficient, for example, when the remaining resource can be used to send only an amount of uplink data in a buffer of one LCG, an LCG with a highest priority may be determined in the plurality of LCGs, and an amount of uplink data in a buffer of the LCG may be reported. The LCG with a highest priority may be an LCG that includes a to-be-reported amount of uplink data in a buffer and to which an LCH with a highest priority belongs. In this case, the LCG ID in the short truncated BSR is an ID of the LCG with a highest priority, and a buffer size field is the amount of uplink data in a buffer corresponding to the LCG with a highest priority. The LCG ID may occupy three bits, and the buffer size field may occupy five bits.

In some possible implementations, the fourth BSR format includes a fourth field, the fourth field may occupy eight bits, and the fourth field is used to indicate whether eight LCGs of the terminal device include to-be-reported uplink amounts of data in a buffer.

For example, the BSR in the fourth BSR format may be used to indicate, in a bitmap manner, whether the plurality of LCGs include to-be-reported uplink amounts of data in a buffer. Using a bitmap manner to indicate whether a plurality of LCGs include to-be-reported uplink amounts of data in a buffer means using a plurality of bits to indicate whether the plurality of LCGs include to-be-reported uplink amounts of data in a buffer. The plurality of bits are in a one-to-one correspondence with the plurality of LCGs, and each of the plurality of bits is used to indicate whether an LCG corresponding to the bit includes a to-be-reported amount of uplink data in a buffer. For example, a value of each of the plurality of bits may be "1" or "0", the bit value "1" may indicate that a corresponding LCG includes a to-be-reported amount of uplink data in a buffer, and the bit value "0" may indicate that a corresponding LCG does not include a to-be-reported amount of uplink data in a buffer.

Figure 17:
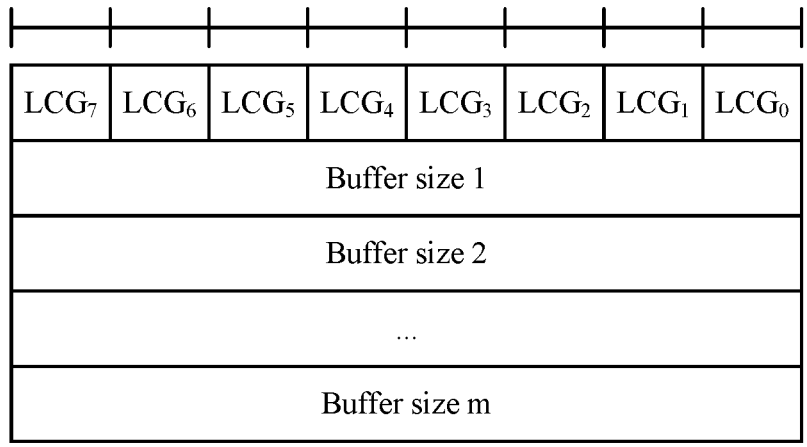
FIG. 17 is a schematic structural diagram of a BSR format according to another embodiment of this disclosure.

FIG. 17 shows an example of the fourth BSR format. An LCGi is used to indicate whether an LCG whose index is i includes a to-be-reported amount of uplink data in a buffer, where i may range from 0 to 7.

If the LCGi is set to 1, the LCG whose field identifier index is i includes a to-be-reported amount of uplink data in a buffer. If the LCGi is set to 0, it indicates that the LCG whose index is i does not include a to-be-reported amount of uplink data in a buffer. For each LCG, eight bits may be used to indicate a buffer size of the amount of uplink data in a buffer of the LCG. In FIG. 17, m may be any value from 1 to 8. For example, m is equal to a quantity of LCGs that each include a to-be-reported amount of uplink data in a buffer. If no LCG includes a to-be-reported amount of uplink data in a buffer, a buffer size may not be reported.

For example, in the BSR in the fourth BSR format, eight bits may be used to indicate whether eight LCGs include to-be-reported uplink amounts of data in a buffer. The eight bits are in a one-to-one correspondence with the eight LCGs. Each of the eight bits indicates whether a corresponding LCG in the eight LCGs includes a to-be-reported amount of uplink data in a buffer.

Figure 18:
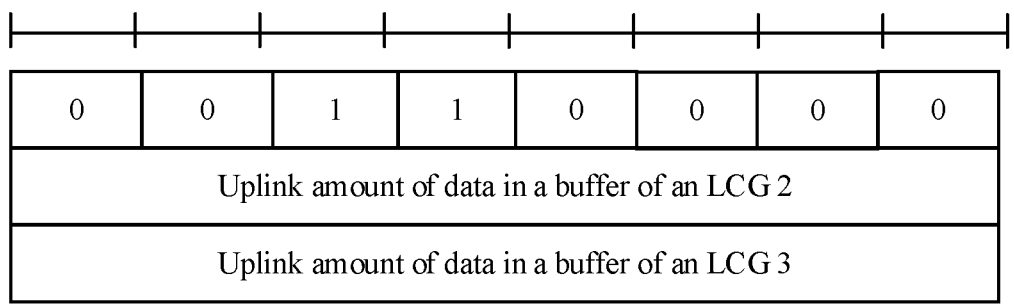
FIG. 18 is a schematic structural diagram of a BSR format according to another embodiment of this disclosure.

For example, as shown in FIG. 18, when there are eight LCGs in total, a bitmap used to indicate whether the eight LCGs each include a to-be-reported amount of uplink data in a buffer includes eight bits. In the eight bits, if a value of the third bit is "1", a value of the fourth bit is "1", and all the other bits are "0", it indicates that an amount of uplink data in a buffer of an LCG whose index is 2 and an amount of uplink data in a buffer of an LCG whose index is 3 are reported in the BSR in the fourth BSR format. A field used to report the amount of uplink data in a buffer of the LCG whose index is 2 may occupy eight bits, and a field used to report the amount of uplink data in a buffer of the LCG whose index is 3 may also occupy eight bits.

In some possible implementations, the sending, by the terminal device, a truncated BSR to an access network device by using the second target BSR format may include: sending, by the terminal device, the truncated BSR to the access network device based on priorities of the plurality of LCGs by using the second target BSR format, where a highest priority of a logical channel LCH in each of the plurality of LCGs is used as a priority of the LCG In other words, when a current uplink resource is insufficient to send the plurality of LCGs, the terminal may determine, based on the priorities of the plurality of LCGs, LCGs that are in the plurality of LCGs and that are to be sent to the access network device. The priorities of the plurality of LCGs may be determined based on priorities of LCHs included in the plurality of LCGs.

For example, there are N LCGs, each LCG includes a plurality of logical channels (logical channel, LCH), and the LCHs have different priorities. A highest priority of an LCH included in each LCG is used as a priority of the LCG. The terminal device may sort the plurality of LCGs in descending order of the priorities. The terminal device adds amount of uplink data in a buffer information of first M LCGs to the BSR based on a quantity M of LCGs that can be sent by using an uplink resource, and sends the BSR to a network side device. N is an integer greater than 1, M is an integer greater than or equal to 1, and M is less than N.

For example, there are eight LCGs, sequentially denoted as an LCG 0 to an LCG 7. It should be understood that the sequence herein does not represent priorities of the eight LCGs. A highest priority of LCHs included in each of the eight LCGs is used as a priority of the LCG. In descending order of the priorities, the eight LCGs are sorted as follows: the LCG 5, the LCG 3, the LCG 6, the LCG 4, the LCG 1, the LCG 2, the LCG 7, and the LCG 0.

Figure 19:
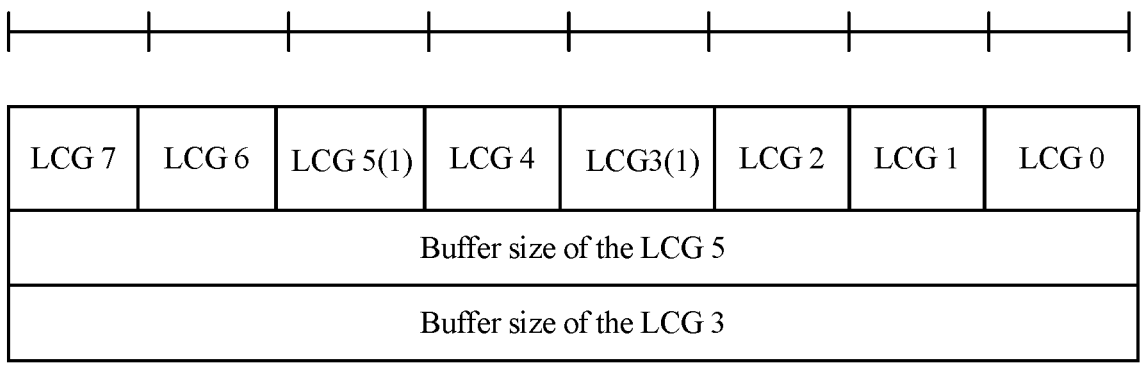
FIG. 19 is a schematic structural diagram of a BSR format according to another embodiment of this disclosure.

When the terminal device determines that an uplink resource used to send the BSR is sufficient to send uplink amounts of data in a buffer of two LCGs only, if the terminal device currently determines that only amount of data in a buffer information of the LCG 5 and the LCG 3 (with priorities ranked first and second) can be sent, in a possible implementation, as shown in FIG. 19, an LCGi bit corresponding to a first byte is set to 1. In other words, bits corresponding to the LCG 5 and the LCG 3 are each set to 1. Then, in a corresponding buffer size field, buffer status information of a corresponding LCG is placed in an LCG priority sequence. In other words, amount of uplink data in a buffer information of the LCG 5 is first placed, and then amount of uplink data in a buffer information of the LCG 3 is placed.

Figure 20:
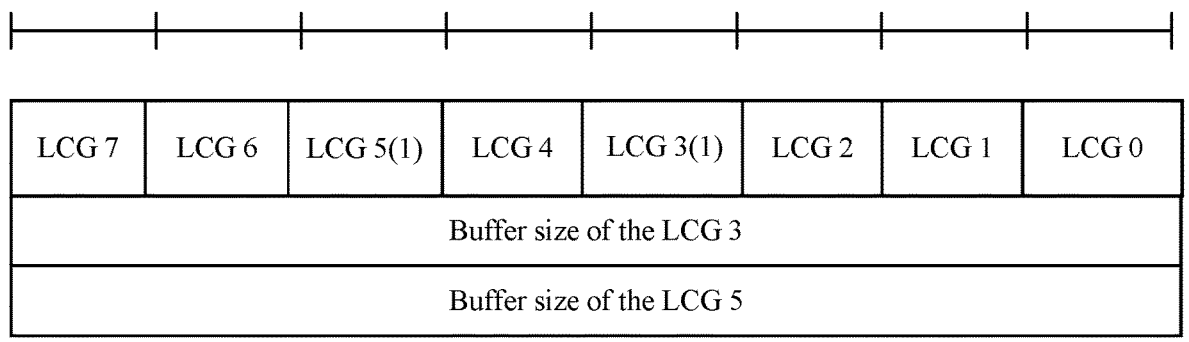
FIG. 20 is a schematic structural diagram of a BSR format according to another embodiment of this disclosure.

In another possible implementation, as shown in FIG. 20, an LCGi bit corresponding to a first byte is set to 1. In other words, bits corresponding to the LCG 5 and the LCG 3 are each set to 1. In addition, a buffer size is placed based on a value in an LCG ID. In other words, amount of uplink data in a buffer information of the LCG 3 is first placed, and then amount of uplink data in a buffer information of the LCG 5 is placed.

The access network device may correspondingly determine, based on an LCG priority, LCGs whose uplink amounts of data in a buffer are reported by the terminal device, and determine the uplink amounts of data in a buffer of the LCGs.

It should be understood that bit values used to indicate whether the LCG 7 to the LCG 0 each include a to-be-reported amount of uplink data in a buffer are sequentially recorded in the first byte in FIG. 19 and FIG. 20. This recording sequence does not represent the priorities of the eight LCGs. Optionally, bit values used to indicate whether the LCG 7 to the LCG 0 each include a to-be-reported amount of uplink data in a buffer may be recorded in the byte in any sequence. For example, the bit values used to indicate whether the LCG 0, the LCG 1, the LCG 2, the LCG 3, the LCG 4, the LCG 5, the LCG 6, and the LCG 7 each include a to-be-reported amount of uplink data in a buffer are sequentially recorded in the byte. Both the terminal device and the access network device need to learn of the recording sequence.

In some possible implementations, the communication method may further include: sending, by the terminal device, first indication information to the access network device, where the first indication information is used to indicate the BSR format used for sending the truncated BSR.

In other words, the terminal device may further send indication information (that is, the first indication information) to the access network device, where the indication information is used to indicate a BSR format used for a BSR to send the amount of uplink data in a buffer, or a type of a BSR used to send the amount of uplink data in a buffer.

For example, the first indication information may be an LCID value. Different LCID values are used to indicate different BSR formats, or different LCIDs are used to indicate different BSR types. The LCID may be located in a MAC subheader. The terminal device may obtain the first indication information by parsing an LCID field in the MAC subheader, to learn of a BSR format and/or a BSR type. For an LCID value table, refer to Table 2.

TABLE 2

| LCID value table | |
|---|---|
| Index (index) | LCID value (LCID value) |
| 000000 | CCCH of size other than 48 bits |
| 000001-100000 | Identifier of a logical channel |
| 100001 | CCCH of size 48 bits |
| 100010-110100 | Reserved |
| 110101 | Recommended bit rate query |
| 110110 | Multi-entry PHR: 4-byte Ci |
| 110111 | Configured grant confirmation |
| 111000 | Multi-entry PHR: 1-byte Ci |
| 111001 | Single entry PHR |
| 111010 | Cell radio network temporary identifier (C-RNTI) |
| 111011 | Short truncated BSR |
| 111100 | Long truncated BSR |
| 111101 | Short BSR |
| 111110 | Long BSR |
| 111111 | Padding |

In some possible implementations, the communication method may further include: sending, by the terminal device, second indication information to the access network device, where the second indication information is used to indicate a length of the truncated BSR.

In other words, the terminal device may further send indication information to the access network device, where the indication information is used to indicate a length of the BSR.

Figure 21:
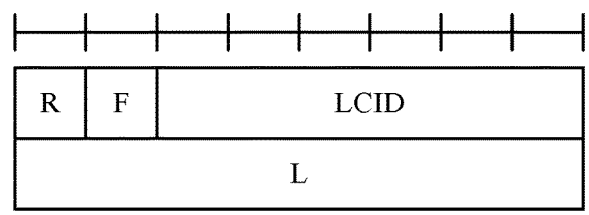
FIG. 21 is a schematic structural diagram of a BSR format according to another embodiment of this disclosure.
Figure 22:
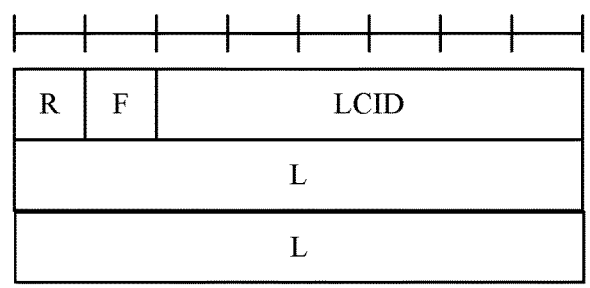
FIG. 22 is a schematic structural diagram of a BSR format according to another embodiment of this disclosure.

The second indication information may be a length field that indicates a length in the MAC subheader, and a quantity of bits corresponding to the length field may be 8, 16, or another value. No limitation is imposed herein. As shown in FIG. 21, the length field "L" occupies eight bits. As shown in FIG. 22, the length field "L" occupies 16 bits. In FIG. 21 and FIG. 22, an R field indicates that the field is reserved, and an F field (Format field) is used to indicate a size of the length field. For example, if a value of the F field is 0, it indicates that the length field L occupies eight bits; or if a value of the F field is 1, it indicates that the length field L occupies 16 bits.

As shown in FIG. 24, this disclosure further provides a BSR reporting communication method. The communication method includes the following steps: S2410. An access network device receives a BSR sent by a terminal device by using a second target BSR format.

When a current uplink resource is insufficient to report amount of data in a buffer information of a plurality of LCGs, if a current uplink resource quantity can accommodate only one byte, the second target BSR format is a third BSR format; otherwise, the second target BSR format is a fourth BSR format.

Both the third BSR format and the fourth BSR format are truncated BSR formats, the truncated BSR format is a format used by the terminal device to send a truncated BSR, and the truncated BSR is used to report uplink amounts of data in a buffer of some of the plurality of LCGs.

In some possible implementations, a BSR sent by using the third BSR format occupies one byte, and a BSR sent by using the fourth BSR format occupies two or more bytes.

In some possible implementations, the third BSR format includes a third field, the third field occupies five bits, and the third field is used to indicate an amount of uplink data in a buffer of one of the LCGs.

In some possible implementations, the fourth BSR format includes a fourth field, the fourth field occupies eight bits, and the fourth field is used to indicate whether eight LCGs of the terminal device include to-be-reported uplink amounts of data in a buffer.

In some possible implementations, the receiving, by an access network device, a BSR sent by a terminal device by using a second target BSR format includes:

receiving, by the access network device based on priorities of the plurality of LCGs, the BSR sent by the terminal device by using the second target BSR, where a highest priority of a logical channel LCH in each of the plurality of LCGs is used as a priority of the LCG, and priorities of the some of LCGs are each higher than a priority of another LCG in the plurality of LCGs.

In some possible implementations, the communication method further includes: receiving, by the access network device, first indication information from the terminal device, where the first indication information is used to indicate the second target BSR format.

In some possible implementations, the communication method further includes: receiving, by the access network device, second indication information from the terminal device, where the second indication information is used to indicate a length of the BSR sent by using the second target BSR format.

The communication method shown in FIG. 24 corresponds to the communication method shown in FIG. 23. For brevity, details are not described herein again.

In another embodiment of this disclosure, in the following case in which "a first field that is in a BSR sent by a terminal device by using a first BSR format and that is used to indicate a reported amount of uplink data in a buffer and a second field that is in a BSR sent by the terminal device by using a second BSR format and that is used to indicate a reported amount of uplink data in a buffer include a same quantity of bits, and when a bit value of the first field is the same as a bit value of the second field, an amount of uplink data in a buffer indicated by the bit value of the first field is different from an amount of uplink data in a buffer indicated by the bit value of the second field", one implementation of S220 is as follows: The terminal device determines a first target BSR format from the first BSR format and the second BSR format based on reporting precision of the LCG The BSR in the first BSR format indicates an amount of uplink data in a buffer less than or equal to a first data volume threshold, the BSR in the second BSR format indicates an amount of uplink data in a buffer less than or equal to a second data volume threshold, and the first data volume threshold is less than the second data volume threshold. In this case, if the reporting precision of the LCG is high, the terminal device determines the first BSR format as the first target BSR format; or if the reporting precision of the LCG is low, the terminal device determines the second BSR format as the first target BSR format.

The reporting precision is the granularity described above. Higher reporting precision indicates a smaller value of p in the foregoing formula; or lower reporting precision indicates a larger value of p in the foregoing formula.

The reporting precision of the LCG may be received by the terminal device from an access network device.

The current uplink resource may be a resource requested by the terminal from the access network device for BSR transmission, or may be a resource that remains after the terminal transmits uplink data.

Optionally, the terminal device may further send indication information to the access network device, where the indication information is used to indicate a BSR format used for a BSR to send the amount of uplink data in a buffer.

Optionally, the terminal device may further send indication information to the access network device, where the indication information is used to indicate a length of the BSR.

When the current uplink resource is insufficient to send the plurality of LCGs, the terminal may determine, based on priorities of the plurality of LCGs, LCGs that are in the plurality of LCGs and that are to be sent to the access network device.

The priorities of the plurality of LCGs may be determined based on priorities of LCHs included in the plurality of LCGs.

For example, there are N LCGs, each LCG includes a plurality of logical channels (LCH), and the LCHs have different priorities. A highest priority of an LCH included in each LCG is used as a priority of the LCG. The terminal device may sort the plurality of LCGs in descending order of the priorities. The terminal device selects LCG IDs of first M LCGs based on a quantity M of LCGs that can be sent by using an uplink resource, and sends the BSR in the format in FIG. 4. N is an integer greater than 1, M is an integer greater than or equal to 1, and M is less than N.

In another embodiment of this disclosure, in the following case in which "a first field that is in a BSR sent by a terminal device by using a first BSR format and that is used to indicate an amount of uplink data in a buffer and a second field that is in a BSR sent by the terminal device by using a second BSR format and that is used to indicate an amount of uplink data in a buffer include a same quantity of bits, and when a bit value of the first field is the same as a bit value of the second field, an amount of uplink data in a buffer indicated by the bit value of the first field is different from an amount of uplink data in a buffer indicated by the bit value of the second field", one implementation of S220 is as follows: The terminal device determines a first target BSR format from the first BSR format and the second BSR format based on reporting precision of the LCG The BSR in the first BSR format indicates an amount of uplink data in a buffer less than or equal to a first data volume threshold, the BSR in the second BSR format indicates an amount of uplink data in a buffer less than or equal to a second data volume threshold, and the first data volume threshold is less than the second data volume threshold. In this case, if the reporting precision of the LCG is high, the terminal device determines the first BSR format as the first target BSR format; or if the reporting precision of the LCG is low, the terminal device determines the second BSR format as the first target BSR format.

The reporting precision is the granularity described above. Higher reporting precision indicates a smaller value of p in the foregoing formula; or lower reporting precision indicates a larger value of p in the foregoing formula.

The reporting precision of the LCG may be received by the terminal device from an access network device.

FIG. 8 is a schematic flowchart of a communication method according to another embodiment of this disclosure. It should be understood that FIG. 8 shows steps or operations of the communication method, but these steps or operations are merely an example. In this embodiment of this disclosure, other operations or variations of the operations in FIG. 8 may be performed. The communication method shown in FIG. 8 may include S810.

S810. An access network device receives a target BSR sent by a terminal device by using a first target BSR format, where the target BSR is used to indicate an amount of uplink data in a buffer of one LCG The first target BSR format is a BSR format that is determined in a plurality of BSR formats when the terminal device determines that only one logical channel group LCG includes to-be-reported buffer data, and the plurality of BSR formats are a plurality of formats used by the terminal device to report different BSRs based on different ranges of amount of uplink data in a buffer.

The access network device in the communication method shown in FIG. 8 may be the access network device in the communication method shown in FIG. 2. A related technical feature in the communication method shown in FIG. 2 may also be used in the communication method shown in FIG. 8. Details are not described herein again.

FIG. 9 is a schematic flowchart of a communication method according to another embodiment of this disclosure. It should be understood that FIG. 9 shows steps or operations of the communication method, but these steps or operations are merely an example. In this embodiment of this disclosure, other operations or variations of the operations in FIG. 9 may be performed. The communication method shown in FIG. 9 may include S910 and S920.

S910. A terminal device determines that an LCG including to-be-reported buffer data meets at least one of the following conditions: an amount of uplink data in a buffer of the LCG is not reported within duration from a trigger moment for BSR reporting to a current moment; a time interval between a moment at which the terminal device reports an amount of uplink data in a buffer of the LCG last time and a current moment is greater than or equal to a time threshold; a data volume difference between an amount of uplink data in a buffer of the LCG reported by the terminal device last time and a current amount of uplink data in a buffer of the LCG is greater than or equal to a data volume threshold; or a highest priority of an LC in the LCG is greater than or equal to a priority threshold.

For example, the terminal device maintains a variable for each LCG to record whether an amount of uplink data in a buffer of the LCG has been reported. If an amount of uplink data in a buffer of an LCG is reported, a variable corresponding to the LCG may be set to 1; or if an amount of uplink data in a buffer of a LCG is not reported, a variable corresponding to the LCG may be set to 0.

According to the foregoing method, the terminal device can be prevented from repeatedly reporting an amount of uplink data in a buffer of a same LCG, and the access network device can also be prevented from repeatedly allocating an uplink resource to a same LCG of a same terminal device, thereby saving resources.

If a time interval between times of consecutively reporting a same LCG twice is less than the time threshold, it indicates that the terminal device may further receive, in this waiting time, a resource being allocated by the access network device, and the terminal device does not need to perform repeated reporting. Alternatively, when a time interval between times of consecutively reporting a same LCG twice is greater than the time threshold, it indicates that the terminal device has not obtained an allocated resource for a long time. This is beyond a limitation of the terminal device, and a BS needs to be reported to notify the access network device of a resource requirement of the terminal device.

If data volumes of a same LCG consecutively reported twice are each less than the data volume threshold, it indicates that the terminal device requires a small quantity of resources, and does not need to send a BS to the access network device again to request the small quantity of resources. On the contrary, when the data volume difference between the amount of uplink data in a buffer of the LCG reported by the terminal device last time and the current amount of uplink data in a buffer of the LCG is greater than or equal to the data volume threshold, it indicates that the terminal device has a large amount of accumulated data. This is beyond a limitation of the terminal device, and reporting needs to be performed again.

If a highest priority of an LCH in a specific LCG is greater than or equal to the priority threshold, it indicates that a priority of to-be-reported data of the LCG is relatively high for the terminal device at this moment, and a reporting requirement is relatively urgent.

S920. The terminal sends the BSR to the access network device, where the BSR is used to indicate the current amount of uplink data in a buffer of the LCG In other words, the terminal device determines that the LCG including to-be-reported buffer data does not meet at least one of the following conditions: the amount of uplink data in a buffer of the LCG is reported within the duration from the trigger moment for BSR reporting to the current moment; the time interval between the moment at which the terminal device reports the amount of uplink data in a buffer of the LCG last time and the current moment is less than the time threshold; the data volume difference between the amount of uplink data in a buffer of the LCG reported by the terminal device last time and the current amount of uplink data in a buffer of the LCG is less than the data volume threshold; or the highest priority of the LCH in the LCG is less than the priority threshold. In this case, the terminal device does not send a BSR that indicates the current amount of uplink data in a buffer of the LCG It can be learned that, in the communication method, the amount of uplink data in a buffer of the LCG can be prevented from being repeatedly reported, thereby saving resources.

In S910, the terminal may determine, in the following manner, that the amount of uplink data in a buffer of the LCG is not reported within the duration from the trigger moment for BSR reporting to the current moment.

When determining that an indication information set does not include indication information of the LCG, the terminal determines that the amount of uplink data in a buffer of the LCG is not reported within the duration from the trigger moment for BSR reporting to the current moment, where indication information in the indication information set is used to indicate an LCG whose amount of uplink data in a buffer is reported.

Correspondingly, after the terminal device sends the BSR, the communication method further includes: adding, by the terminal device to the indication information set, indication information used to indicate that the amount of uplink data in a buffer of the LCG is reported.

For example, the terminal device may maintain a variable set, and a variable in the variable set is used to record an LCG whose uplink buffer data is reported within the duration from the trigger moment for BSR reporting to the current moment.

When the terminal device currently needs to send the BSR, the terminal device may query whether the variable set includes a variable recording that the amount of uplink data in a buffer of the LCG has been reported. If the variable set includes the variable, the terminal device does not report the amount of uplink data in a buffer of the LCG; or if the variable set does not include the variable, the terminal device reports the amount of uplink data in a buffer of the LCG, and records, by using a variable in the variable set, that the amount of uplink data in a buffer of the LCG has been reported.

In S910, the terminal device may determine, in the following manner, that the time interval between the moment at which the amount of uplink data in a buffer of the LCG is reported last time and the current moment is greater than or equal to the time threshold: A timer may be maintained on the terminal device. The timer starts from the moment at which the terminal device reports the amount of uplink data in a buffer of the LCG last time. If the current moment exceeds duration of the timer, the terminal device may report the amount of uplink data in a buffer of the LCG; or if the current moment does not exceed duration of the timer, the terminal device does not report the amount of uplink data in a buffer of the LCG Before the terminal device performs S910, the communication method may further include: receiving, by the terminal device from the access network device, at least one piece of the following information: the time threshold, the data volume threshold, and the priority threshold.

Therefore, when the terminal device performs S910, the time threshold, the data volume threshold, or the priority threshold may be used.

A communication method in another embodiment of this disclosure may include:

receiving, by an access network device, a BSR sent by a terminal device, where the BSR includes an amount of uplink data in a buffer of an LCG;

determining, by the access network device, that the LCG corresponding to the BSR meets at least one of the following conditions: the amount of uplink data in a buffer of the LCG is not reported within duration from a trigger moment for BSR reporting by the terminal device to a current moment; a time interval between a moment at which the terminal device reports an amount of uplink data in a buffer of the LCG last time and a current moment is greater than or equal to a time threshold; a data volume difference between an amount of uplink data in a buffer of the LCG received by the terminal device last time and a current amount of uplink data in a buffer of the LCG is greater than or equal to a data volume threshold; or a highest priority of an LC in the LCG is greater than or equal to a priority threshold; and allocating, by the access network device, a resource to the terminal, where the resource is used by the terminal to report buffer data corresponding to the amount of uplink data in a buffer of the LCG In other words, the access network device determines that the LCG including to-be-reported buffer data does not meet at least one of the following conditions: the amount of uplink data in a buffer of the LCG is reported within the duration from the trigger moment for BSR reporting by the terminal device to the current moment; the time interval between the moment at which the terminal device reports the amount of uplink data in a buffer of the LCG last time and the current moment is less than the time threshold; the data volume difference between the amount of uplink data in a buffer of the LCG reported by the terminal device last time and the current amount of uplink data in a buffer of the LCG is less than the data volume threshold; or the highest priority of the LC in the LCG is less than the priority threshold. In this case, the access network device does not allocate, to the terminal, a resource used by the terminal to report the buffer data corresponding to the amount of uplink data in a buffer of the LCG It can be learned that in the communication method, the access network device can be prevented from repeatedly allocating resources, thereby saving resources.

The communication method in another embodiment of this disclosure may include: sending, by an access network device, first indication information to a terminal device, where the first indication information is used to instruct the terminal device to report an amount of uplink data in a buffer of a first LCG by using a BSR in a fifth BSR format; and receiving, by the access network device, the amount of uplink data in a buffer of the first LCG that is reported by the terminal device by using the BSR in the fifth BSR format.

The access network device may determine, based on a data volume usually corresponding to a service carried on each LC in the LCG, a BSR format corresponding to the LCG For example, an LC included in an LCG is used to carry a voice service, and a maximum data volume corresponding to the voice service is 1000 bytes. In this case, the access network device may select, by using a method similar to the method in FIG. 2, an appropriate BSR format as a BSR format to report an amount of uplink data in a buffer of the LCG Correspondingly, the terminal device receives first indication information sent by the access network device, where the first indication information is used to instruct the terminal device to report the amount of uplink data in a buffer of the first LCG by using the BSR in the fifth BSR format. The terminal device determines that only the first LCG includes to-be-sent uplink buffer data. The terminal device reports the amount of uplink data in a buffer of the first LCG by using the BSR in the fifth BSR format.

The fifth BSR format may be the first BSR format or the second BSR format described above. Details are not described herein again.

FIG. 10 is a schematic structural diagram of a terminal device according to an embodiment of this disclosure. It should be understood that a terminal device 1000 shown in FIG. 10 is merely an example. The terminal device in this embodiment of this disclosure may further include other modules or units, or may include modules having functions similar to those of modules in FIG. 10, or may not necessarily include all modules in FIG. 10.

The terminal device 1000 includes a processing module 1010 and a sending module 1020.

The processing module 1010 is configured to determine a quantity of logical channel groups LCGs currently including to-be-reported buffer data.

The processing module 1010 is further configured to: when determining that only one LCG includes to-be-reported buffer data, determine one of a plurality of BSR formats as a first target BSR format, where different ranges of uplink amounts of data in a buffer are reported by the terminal device based on the plurality of BSR formats.

The sending module 1020 is configured to send a target BSR to an access network device by using the first target BSR format, where the target BSR is used to indicate an amount of uplink data in a buffer of the LCG Optionally, the plurality of BSR formats include a first BSR format and a second BSR format, an amount of uplink data in a buffer reported by the terminal device by using the first BSR format is less than or equal to a first data volume threshold, and an amount of uplink data in a buffer reported by the terminal device by using the second BSR format is less than or equal to a second data volume threshold.

Correspondingly, the processing module 1010 is specifically configured to:

when the amount of uplink data in a buffer of the LCG is less than or equal to the first data volume threshold, determine the first BSR format as the first target BSR format; or when the amount of uplink data in a buffer of the LCG is greater than the first data volume threshold, determine the second BSR format as the first target BSR format.

Optionally, a BSR sent by using the first BSR format occupies one byte, and a BSR sent by using the second BSR format occupies two or more bytes.

Optionally, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies eight bits.

Optionally, a BSR sent by using the first BSR format and a BSR sent by using the second BSR format each occupy one byte.

Optionally, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies five bits.

Optionally, the first BSR format is a short BSR format, and the second BSR format is a long BSR format; or both the first BSR format and the second BSR format are short BSR formats.

Optionally, the plurality of BSR formats include a third BSR format and a fourth BSR format, and both the third BSR format and the fourth BSR format are truncated BSR formats. A truncated BSR sent by the terminal device by using the truncated BSR format is used to report uplink amounts of data in a buffer of some of all the LCGs including to-be-reported buffer data.

The processing module 1010 is further configured to:

when determining that a plurality of LCGs include to-be-reported uplink buffer data, determine whether a current uplink resource is sufficient to report uplink amounts of data in a buffer of the plurality of LCGs; and when the current uplink resource is insufficient to report amount of data in a buffer information of the plurality of LCGs, if a current uplink resource quantity can accommodate only one byte, determine the third BSR format as a second target BSR format; otherwise, determine the fourth BSR format as a second target BSR format.

Correspondingly, the sending module 1020 is further configured to send the truncated BSR to the access network device by using the second target BSR format, where the truncated BSR includes the uplink amounts of data in a buffer of the some of the plurality of LCGs.

Optionally, a highest priority of a logical channel LCH in each of the some of LCGs is greater than or equal to a priority of each LC in an LCG other than the some of LCGs in the plurality of LCGs.

It should be understood that the modules included in the terminal device 1000 in FIG. 10 may be configured to implement corresponding steps performed by the terminal device in the communication method shown in FIG. 2. For brevity, details are not described herein again.

Figure 11:
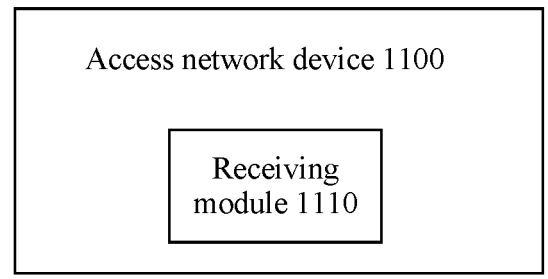
FIG. 11 is a schematic structural diagram of an access network device according to another embodiment of this disclosure.

FIG. 11 is a schematic structural diagram of an access network device according to an embodiment of this disclosure. It should be understood that an access network device 1100 shown in FIG. 11 is merely an example. The access network device 1100 in this embodiment of this disclosure may further include other modules or units, or may include modules having functions similar to those of modules in FIG. 11, or may not necessarily include all modules in FIG. 11.

A receiving module 1110 is configured to receive a target BSR sent by a terminal device by using a first target BSR format, where the target BSR is used to indicate an amount of uplink data in a buffer of the one LCG The first target BSR format is a BSR format that is determined in a plurality of BSR formats when the terminal device determines that only one logical channel group LCG includes to-be-reported buffer data, and the plurality of BSR formats are a plurality of formats used by the terminal device to report different BSRs based on different ranges of an uplink amount of data in a buffer.

Optionally, the plurality of BSR formats include a first BSR format and a second BSR format, the first BSR format is a format used by the terminal device to report a BSR based on an amount of data in a buffer less than or equal to a first data volume threshold, and the second BSR format is a format used by the terminal device to report a BSR based on an amount of data in a buffer less than or equal to a second data volume threshold.

Optionally, a BSR sent by using the first BSR format occupies one byte, and a BSR sent by using the second BSR format occupies two or more bytes.

Optionally, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies eight bits.

Optionally, a BSR sent by using the first BSR format and a BSR sent by using the second BSR format each occupy one byte.

Optionally, a first field that is in the BSR sent by using the first BSR format and that is used to indicate a reported amount of uplink data in a buffer occupies five bits, and a second field that is in the BSR sent by using the second BSR format and that is used to indicate a reported amount of uplink data in a buffer occupies five bits.

Optionally, the first BSR format is a short BSR format, and the second BSR format is a long BSR format; or both the first BSR format and the second BSR format are short BSR formats.

Optionally, the plurality of BSR formats include a third BSR format and a fourth BSR format.

The receiving module 1110 is further configured to receive a BSR sent by the terminal device by using a second target BSR format.

When a current uplink resource is insufficient to report amount of data in a buffer information of the plurality of LCGs, if a current uplink resource quantity can accommodate only one byte, the second target BSR format is the third BSR format; otherwise, the second target BSR format is the fourth BSR format.

Both the third BSR format and the fourth BSR format are truncated BSR formats, the truncated BSR format is a format used by the terminal device to send a truncated BSR, and the truncated BSR is used to report uplink amounts of data in a buffer of some of the plurality of LCGs.

It should be understood that the modules included in the access network device 1100 in FIG. 11 may be configured to implement corresponding steps performed by the access network device in the communication method shown in FIG. 8. For brevity, details are not described herein again.

Figure 12:
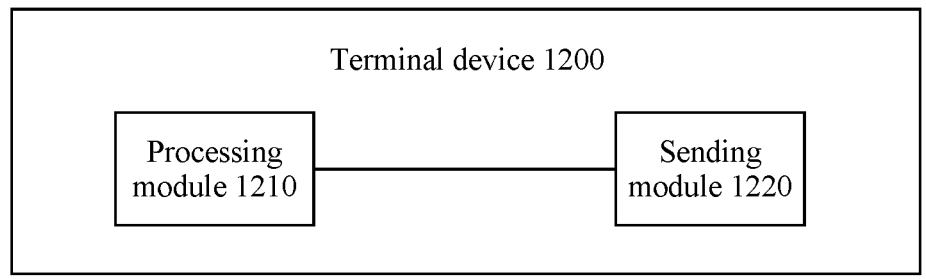
FIG. 12 is a schematic structural diagram of a terminal device according to another embodiment of this disclosure.

FIG. 12 is a schematic structural diagram of a terminal device according to another embodiment of this disclosure. It should be understood that a terminal device 1200 shown in FIG. 12 is merely an example. The terminal device in this embodiment of this disclosure may further include other modules or units, or may include modules having functions similar to those of modules in FIG. 12, or may not necessarily include all modules in FIG. 12.

The terminal device 1200 includes a processing module 1210 and a sending module 1220.

The processing module 1210 is configured to determine that a logical channel group LCG including to-be-reported buffer data meets at least one of the following conditions:

an amount of uplink data in a buffer of the LCG is not reported within duration from a trigger moment for BSR reporting to a current moment;

a time interval between a moment at which the terminal device reports an amount of uplink data in a buffer of the LCG last time and a current moment is greater than or equal to a time threshold;

a data volume difference between an amount of uplink data in a buffer of the LCG reported by the terminal device last time and a current amount of uplink data in a buffer of the LCG is greater than or equal to a data volume threshold; or a highest priority of a logical channel LCH in the LCG is greater than or equal to a priority threshold.

The sending module 1220 is configured to send the BSR to an access network device, where the BSR is used to indicate the current amount of uplink data in a buffer of the LCG Optionally, the processing module 1210 is specifically configured to:

when determining that an indication information set does not include indication information of the LCG, determine that the amount of uplink data in a buffer of the LCG is not reported within the duration from the trigger moment for BSR reporting to the current moment, where indication information in the indication information set is used to indicate an LCG whose amount of uplink data in a buffer is reported.

Optionally, after the sending module 1220 sends the BSR to the access network device, the processing module 1210 is further configured to add, to the indication information set, indication information used to indicate that the amount of uplink data in a buffer of the LCG is reported.

It should be understood that the modules included in the terminal device 1200 in FIG. 12 may be configured to implement corresponding steps performed by the terminal device in the communication method shown in FIG. 9. For brevity, details are not described herein again.

Figure 13:
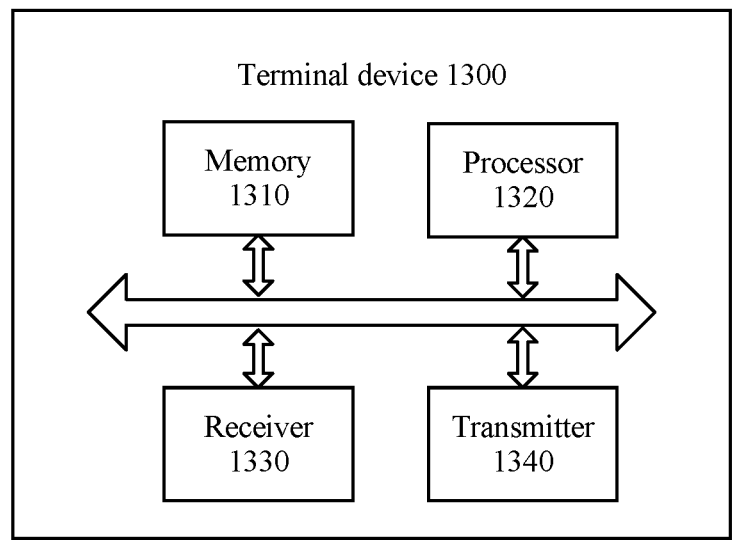
FIG. 13 is a schematic structural diagram of a terminal device according to another embodiment of this disclosure.

FIG. 13 is a schematic structural diagram of a terminal device according to an embodiment of this disclosure. It should be understood that a terminal device 1300 shown in FIG. 13 is merely an example. The terminal device in this embodiment of this disclosure may further include other modules or units, or may include modules having functions similar to those of modules in FIG. 13, or may not necessarily include all modules in FIG. 13.

The terminal device 1300 includes a processor 1320 and a transmitter 1340. Optionally, the terminal device 1300 may further include a memory 1310 and/or a receiver 1330. The receiver 1330 and the transmitter 1340 may be integrated into a transceiver.

The processor 1320 may be configured to implement an operation or a step performed by the processing module 1010 in FIG. 10, and the transmitter 1340 may be configured to implement an operation or a step performed by the sending module 1020 in FIG. 10.

The receiver 1330 may be configured to receive information sent by an access network device.

The memory 1310 is configured to store program code executed by the processor 1320. The memory may be integrated into the processor 1320.

Figure 14:
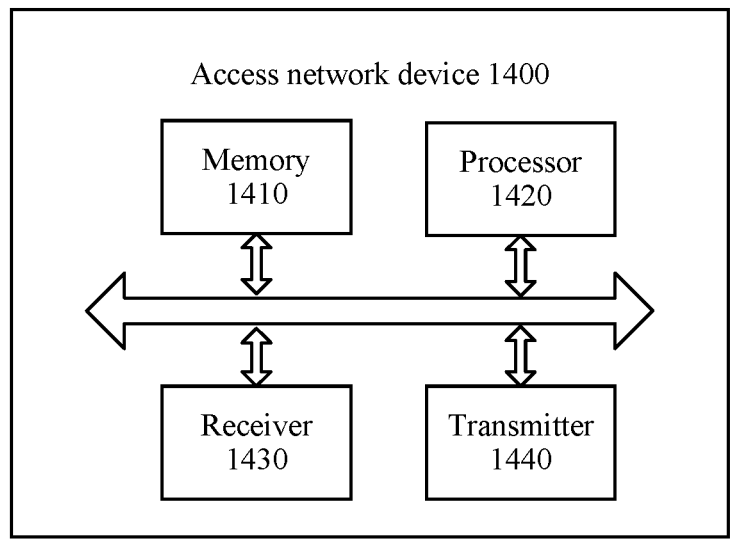
FIG. 14 is a schematic structural diagram of an access network device according to another embodiment of this disclosure.

FIG. 14 is a schematic structural diagram of an access network device according to an embodiment of this disclosure. It should be understood that an access network device 1400 shown in FIG. 14 is merely an example. The access network device in this embodiment of this disclosure may further include other modules or units, or may include modules having functions similar to those of modules in FIG. 14, or may not necessarily include all modules in FIG. 14.

The access network device 1400 includes a processor 1420 and a receiver 1430. Optionally, the access network device 1400 may further include a memory 1410 and/or a transmitter 1440. The receiver 1430 and the transmitter 1440 may be integrated into a transceiver.

The receiver 1430 may be configured to implement an operation or a step performed by the receiving module 1110 in FIG. 11.

The transmitter 1440 may be configured to send information to a terminal device.

The memory 1410 is configured to store program code executed by the processor 1420. The processor 1420 may be configured to execute the program code in the memory 1410. The memory may be integrated into the processor 1420.

Figure 15:
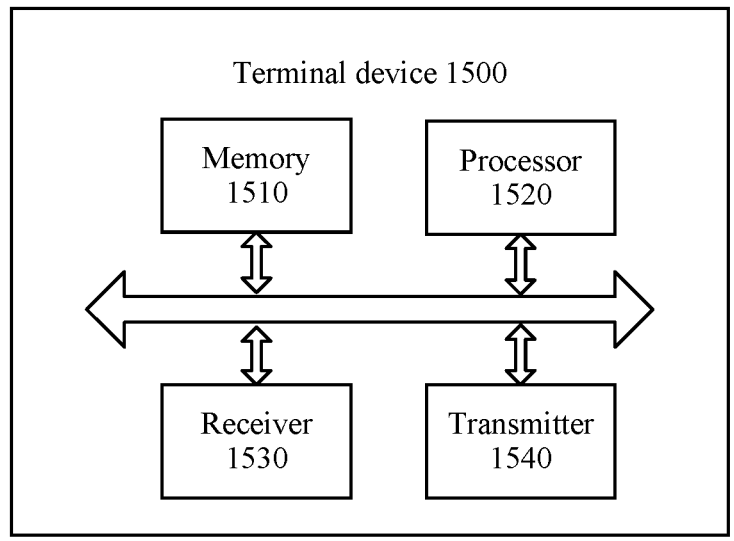
FIG. 15 is a schematic structural diagram of a terminal device according to another embodiment of this disclosure.

FIG. 15 is a schematic structural diagram of a terminal device according to an embodiment of this disclosure. It should be understood that a terminal device 1500 shown in FIG. 15 is merely an example. The terminal device in this embodiment of this disclosure may further include other modules or units, or may include modules having functions similar to those of modules in FIG. 15, or may not necessarily include all modules in FIG. 15.

The terminal device 1500 includes a processor 1520 and a transmitter 1540. Optionally, the terminal device 1500 may further include a memory 1510 and/or a receiver 1530. The receiver 1530 and the transmitter 1540 may be integrated into a transceiver.

The processor 1520 may be configured to implement an operation or a step performed by the processing module 1210 in FIG. 12, and the transmitter 1540 may be configured to implement an operation or a step performed by the sending module 1220 in FIG. 12.

The receiver 1530 may be configured to receive information sent by an access network device.

The memory 1510 is configured to store program code executed by the processor 1520. The memory may be integrated into the processor 1520.

Figure 25:
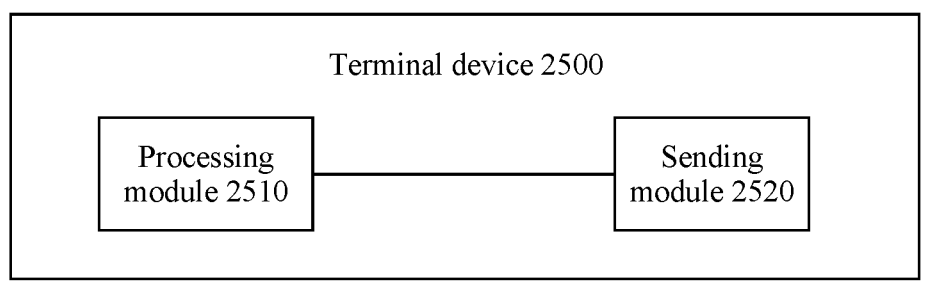
FIG. 25 is a schematic structural diagram of a terminal device according to another embodiment of this disclosure.

FIG. 25 is a schematic structural diagram of a terminal device according to an embodiment of this disclosure. It should be understood that a terminal device 2500 shown in FIG. 25 is merely an example. The terminal device in this embodiment of this disclosure may further include other modules or units, or may include modules having functions similar to those of modules in FIG. 25, or may not necessarily include all modules in FIG. 25.

A processing module 2510 is configured to: when determining that a plurality of LCGs include to-be-reported uplink buffer data, determine whether a current uplink resource is sufficient to report uplink amounts of data in a buffer of the plurality of LCGs; and when the current uplink resource is insufficient to report amount of data in a buffer information of the plurality of LCGs, if a current uplink resource quantity can accommodate only one byte, determine a third BSR format as a second target BSR format; otherwise, determine a fourth BSR format as a second target BSR format.

A sending module 2520 is configured to send a truncated BSR to an access network device by using the second target BSR format, where the truncated BSR includes uplink amounts of data in a buffer of some of the plurality of LCGs, both the third BSR format and the fourth BSR format are truncated BSR formats, the truncated BSR format is a format used by the terminal device to send the truncated BSR, and the truncated BSR is used to report the uplink amounts of data in a buffer of the some of the plurality of LCGs.

Optionally, a BSR sent by using the third BSR format occupies one byte, and a BSR sent by using the fourth BSR format occupies two or more bytes.

Optionally, the third BSR format includes a third field, the third field occupies five bits, and the third field is used to indicate an amount of uplink data in a buffer of one of the some of LCGs.

Optionally, the fourth BSR format includes a fourth field, the fourth field occupies eight bits, and the fourth field is used to indicate whether eight LCGs of the terminal device include to-be-reported uplink amounts of data in a buffer.

Optionally, the sending module is specifically configured to send the truncated BSR to the access network device based on priorities of the plurality of LCGs by using the second target BSR, where a highest priority of a logical channel LCH in each of the plurality of LCGs is used as a priority of the LCG Optionally, the sending module is further configured to send first indication information to the access network device, where the first indication information is used to indicate the BSR format used for the truncated BSR.

Optionally, the sending module is further configured to send second indication information to the access network device, where the second indication information is used to indicate a length of the truncated BSR.

The terminal device 2500 may be used to perform the communication method shown in FIG. 23. For brevity, details are not described herein again.

Optionally, an example of the processing module is a processor, and an example of the sending module is a transmitter. In this case, the terminal device may further include a memory coupled to the processor, and the memory is configured to store program code executed by the processor. The terminal device may further include a receiver, configured to receive information. The receiver and the transmitter may be integrated into a transceiver.

Optionally, an example of the terminal device 2500 is a chip. In this case, an example of the processing module is a processor, and an example of the sending module is a communications interface. When the terminal device 2500 is a chip, the terminal device 2500 may further include a memory coupled to the processor, and the memory is configured to store program code executed by the processor.

Figure 26:
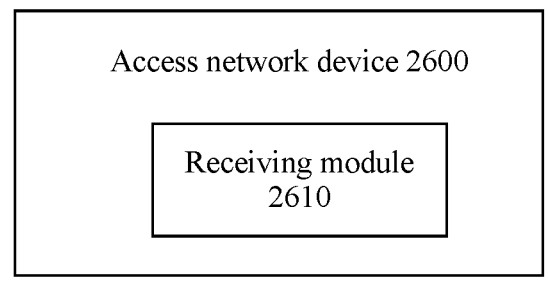
FIG. 26 is a schematic structural diagram of an access network device according to another embodiment of this disclosure.

FIG. 26 is a schematic structural diagram of an access network device according to an embodiment of this disclosure. It should be understood that an access network device 2600 shown in FIG. 26 is merely an example. The access network device in this embodiment of this disclosure may further include other modules or units, or may include modules having functions similar to those of modules in FIG. 26, or may not necessarily include all modules in FIG. 26.

A receiving module 2610 is configured to receive a BSR sent by the terminal device by using a second target BSR format.

When a current uplink resource is insufficient to report amount of data in a buffer information of a plurality of LCGs, if a current uplink resource quantity can accommodate only one byte, the second target BSR format is a third BSR format; otherwise, the second target BSR format is a fourth BSR format.

Both the third BSR format and the fourth BSR format are truncated BSR formats, the truncated BSR format is a format used by the terminal device to send a truncated BSR, and the truncated BSR is used to report uplink amounts of data in a buffer of some of the plurality of LCGs.

Optionally, a BSR sent by using the third BSR format occupies one byte, and a BSR sent by using the fourth BSR format occupies two or more bytes.

Optionally, the third BSR format includes a third field, the third field occupies five bits, and the third field is used to indicate an amount of uplink data in a buffer of one of the some of LCGs.

Optionally, the fourth BSR format includes a fourth field, the fourth field occupies eight bits, and the fourth field is used to indicate whether eight LCGs of the terminal device include to-be-reported uplink amounts of data in a buffer.

Optionally, the receiving module is specifically configured to receive the BSR sent by the terminal device based on priorities of the plurality of LCGs by using the second target BSR, where a highest priority of a logical channel LCH in each of the plurality of LCGs is used as a priority of the LCG Optionally, the receiving module is further configured to receive first indication information sent by the terminal device, where the first indication information is used to indicate the second target BSR format.

Optionally, the receiving module is further configured to receive second indication information sent by the terminal device, where the second indication information is used to indicate a length of the BSR sent by using the second target BSR.

The access network device 2600 may be used to perform the communication method shown in FIG. 24. For brevity, details are not described herein again.

Optionally, an example of the receiving module is a receiver. In this case, the access network device may further include a processor, configured to execute program code. When the processor executes the program code, the processor implements the communication method shown in FIG. 24.

Optionally, the access network device may further include a memory coupled to the processor, and the memory is configured to store the program code executed by the processor. The access network device may further include a transmitter, configured to send information. The receiver and the transmitter may be integrated into a transceiver.

Optionally, an example of the access network device 2600 is a chip. In this case, an example of a receiving module 2610 is a communications interface, and the access network device may further include a processor that executes program code. When the processor executes the program code, the communications interface implements the communication method shown in FIG. 24. When the access network device 2600 is a chip, the access network device 2600 may further include a memory coupled to the processor, and the memory is configured to store the program code executed by the processor.

An example of this disclosure further provides an apparatus (for example, an integrated circuit, a wireless device, or a circuit module), to implement the foregoing method. The apparatus implementing the method described in this specification may be an independent device, or may be a part of a relatively large device. The device may be (i) an independent IC; (ii) a set that includes one or more ICs and that may include a memory IC configured to store data and/or an instruction; (iii) an RFIC, for example, an RF receiver or an RF transmitter; (iv) an ASIC, for example, a mobile station modem; (v) a module that can be built into another device; (vi) a receiver, a cellular phone, a wireless device, a handheld machine, or a mobile unit; or (vii) the like.

The method and apparatus that are provided in the embodiments of this disclosure may be applied to a terminal device or an access network device (the terminal device and the access network device may be collectively referred to as a wireless device). The terminal device, the access network device, or the wireless device may include a hardware layer, an operating system layer running above the hardware layer, and a disclosure layer running above the operating system layer. The hardware layer includes hardware such as a central processing unit (CPU), a memory management unit (MMU), and a memory (also referred to as a main memory). An operating system may be any one or more computer operating systems that implement service processing by using a process, such as a Linux operating system, a UNIX operating system, an Android operating system, an iOS operating system, or a Windows operating system. The disclosure layer includes disclosures such as a browser, a contact list, word processing software, and instant messaging software. In addition, a specific structure of an entity for performing the method is not limited in the embodiments of this disclosure, provided that the entity can perform communication according to the communication method in the embodiments of this disclosure by running a program of code recording the method in the embodiments of this disclosure. For example, the communication method in the embodiments of this disclosure may be performed by a terminal device, an access network device, or a function module that is in a terminal device or an access network device and that can invoke a program and execute the program.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular disclosures and design constraints of the technical solutions. A person skilled in the art may use different methods to implement the described functions for each particular disclosure, but it should not be considered that the implementation goes beyond the scope of the embodiments of this disclosure.

In addition, aspects or features in the embodiments of this disclosure may be implemented as a method, an apparatus, or a product that uses standardized programming and/or engineering technologies. The term "product" used in this disclosure covers a computer program that can be accessed from any computer readable component, carrier, or medium. For example, a computer readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry an instruction and/or data.

All or some of the foregoing embodiments may be implemented through software, hardware, firmware, or any combination thereof. When software is used to implement the embodiments, the embodiments may be implemented fully or partially in a form of a computer program product. The computer program product includes one or more computer instructions. When the computer program instructions are loaded and executed on a computer, the procedures or functions according to the embodiments of this disclosure are fully or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

When the functions are implemented in the form of a software functional unit and sold or used as an independent product, the functions may be stored in a computer readable storage medium. Based on such an understanding, the technical solutions of the embodiments of this disclosure essentially, or the part contributing to the prior art, or some of the technical solutions may be implemented in a form of a software product. The computer software product is stored in a storage medium, and includes several instructions for instructing a computer device (which may be a personal computer, a server, or access network device, or the like) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of this disclosure, but are not intended to limit the protection scope of the embodiments of this disclosure. Any variation or replacement readily figured out by a person skilled in the art within the technical scope disclosed in the embodiments of this disclosure shall fall within the protection scope of the embodiments of this disclosure.

What is claimed is:

1. A communication method, comprising:
   when determining that a number of logical channel groups (LCGs) which comprises to-be-reported uplink buffer data is more than one, determining, by a terminal device, whether a current uplink resource is sufficient to report amounts of the to-be-reported uplink buffer data which belong to the more than one LCGs;
   when the current uplink resource is insufficient to report the amounts of the to-be-reported uplink buffer data which belong to the more than one LCGs, if the current uplink resource can accommodate only one byte, determining, by the terminal device, a first buffer status report (BSR) format as a target BSR format; or if the current uplink resource can accommodate more than one byte, determining, by the terminal device, a second BSR format as the target BSR format, wherein the current uplink resource is for BSR transmission; and
   sending, by the terminal device, a truncated BSR to an access network device using the target BSR format, wherein the truncated BSR comprises amounts of the to-be-reported uplink buffer data which belong to some of the more than one LCGs, wherein
   both the first BSR format and the second BSR format are truncated BSR formats, the truncated BSR format is a format used by the terminal device to send the truncated BSR, and the truncated BSR is used to report the amounts of the to-be-reported uplink buffer data which belong to some of the more than one LCGs.

2. The communication method according to claim 1, wherein a BSR sent using the first BSR format occupies one byte, and a BSR sent using the second BSR format occupies two or more bytes.

3. The communication method according to claim 2, wherein the first BSR format comprises a first field, the first field occupies five bits, and the first field is used to indicate an amount of the to-be-reported uplink buffer data which belong to a first LCG, the first LCG is one of the some of the more than one LCGs.

4. The communication method according to claim 2, wherein the second BSR format comprises a second field, the second field occupies eight bits, and the second field is used to indicate each of eight LCGs of the terminal device whether comprises to-be-reported uplink buffer data.

5. The communication method according to claim 1, wherein the sending, by the terminal device, a truncated BSR to an access network device using the target BSR format comprises:
   sending, by the terminal device, the truncated BSR to the access network device based on priorities of the more than one LCGs using the target BSR format, wherein a highest priority of a logical channel (LCH) in each of the more than one LCGs is used as a priority of the LCG.

6. The communication method according to claim 1, wherein the communication method further comprises:
   sending, by the terminal device, first indication information to the access network device, wherein the first indication information is used to indicate a BSR format used for sending the truncated BSR.

7. The communication method according to claim 1, wherein the communication method further comprises:
   sending, by the terminal device, second indication information to the access network device, wherein the second indication information is used to indicate a length of the truncated BSR.

8. A terminal device, comprising:
   a processor; and
   a non-transitory computer-readable storage medium storing a program to be executed by the processor, the program including instructions to:
   when determining that a number of logical channel groups (LCGs) comprise to-be-reported uplink buffer data is more than one, determine whether a current uplink resource is sufficient to report amounts of the to-be-reported uplink buffer data which belong to the more than one LCGs; and
   when the current uplink resource is insufficient to report the amounts of the to-be-reported uplink buffer data which belong to the more than one LCGs, if a current uplink resource quantity can accommodate only one byte, determine a first buffer status report (BSR) format as a target BSR format; or if the current uplink resource can accommodate more than one byte, determine a second BSR format as the target BSR format, the current uplink resource is for BSR transmission; and
   send a truncated BSR to an access network device using the target BSR format, wherein the truncated BSR comprises amounts of the to-be-reported uplink buffer data which belong to some of the more than one LCGs, wherein
   both the first BSR format and the second BSR format are truncated BSR formats, the truncated BSR format is a format used by the terminal device to send the truncated BSR, and the truncated BSR is used to report the amounts of the to-be-reported uplink buffer data which belong to some of the more than one LCGs.

9. The terminal device according to claim 8, wherein a BSR sent using the first BSR format occupies one byte, and a BSR sent using the second BSR format occupies two or more bytes.

10. The terminal device according to claim 9, wherein the first BSR format comprises a first field, the first field occupies five bits, and the first field is used to indicate an amount of to-be-reported uplink buffer data which belong to a first LCG, the first LCG is one of the some of the more than one LCGs.

11. The terminal device according to claim 9, wherein the second BSR format comprises a second field, the second field occupies eight bits, and the second field is used to indicate each of eight LCGs of the terminal device whether comprises to-be-reported uplink buffer data.

12. The terminal device according to claim 8, wherein the program includes instructions to:
send the truncated BSR to the access network device based on priorities of the more than one LCGs using the target BSR, wherein a highest priority of a logical channel (LCH) in each of the more than one LCGs is used as a priority of the LCG.

13. The terminal device according to claim 8, wherein the program further includes instructions to:
send first indication information to the access network device, wherein the first indication information is used to indicate the BSR format used for sending the truncated BSR.

14. The terminal device according to claim 8, wherein the program further includes instructions to:
send second indication information to the access network device, wherein the second indication information is used to indicate a length of the truncated BSR.

15. An access network device, comprising:
a processor; and
a non-transitory computer-readable storage medium storing a program to be executed by the processor, the program including instructions to:
receive a buffer status report (BSR) sent by a terminal device using a target BSR format, wherein
when a current uplink resource is insufficient to report amounts of to-be-reported uplink buffer data which belong to more than one logical channel groups (LCGs), if a current uplink resource quantity can accommodate only one byte, the target BSR format is a first BSR format; or if the current uplink resource can accommodate more than one byte, the target BSR format is a second BSR format, the current uplink resource is for BSR transmission; and
both the first BSR format and the second BSR format are truncated BSR formats, the truncated BSR format is a format used by the terminal device to send a truncated BSR, and the truncated BSR is used to report the amounts of the to-be-reported uplink buffer data which belong to some of the more than one LCGs.

16. The access network device according to claim 15, wherein a BSR sent using the first BSR format occupies one byte, and a BSR sent using the second BSR format occupies two or more bytes.

17. The access network device according to claim 16, wherein the first BSR format comprises a first field, the first field occupies five bits, and the first field is used to indicate an amount of to-be-reported uplink buffer data of a first LCG, the first LCG is one which belong to some of the more than one LCGs.

18. The access network device according to claim 15, wherein the program further includes instructions to:
receive, based on priorities of the more than one LCGs, the BSR sent by the terminal device using the target BSR, wherein a highest priority of a logical channel (LCH) in each of the more than one LCGs is used as a priority of the LCGs.

19. The access network device according to any one of claim 15, wherein the program further includes instructions to:
receive first indication information from the terminal device, wherein the first indication information is used to indicate the target BSR format.

20. The access network device according to any one of claim 15, wherein the program further includes instructions to:
receive second indication information from the terminal device, wherein the second indication information is used to indicate a length of the BSR sent using the target BSR.

\* \* \* \* \*